United States Patent
Patil et al.

(10) Patent No.: US 9,485,708 B2
(45) Date of Patent: Nov. 1, 2016

(54) SYSTEMS AND METHODS FOR CONCURRENT SERVICE DISCOVERY AND MINIMUM SPANNING TREE FORMATION FOR SERVICE DELIVERY

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/457,906

(22) Filed: Aug. 12, 2014

(65) Prior Publication Data
US 2015/0071121 A1 Mar. 12, 2015

Related U.S. Application Data

(60) Provisional application No. 61/876,141, filed on Sep. 10, 2013.

(51) Int. Cl.
*H04W 40/24* (2009.01)
*H04L 29/08* (2006.01)

(52) U.S. Cl.
CPC .............. *H04W 40/24* (2013.01); *H04L 67/16* (2013.01)

(58) Field of Classification Search
None
See application file for complete search history.

(56) References Cited

U.S. PATENT DOCUMENTS

| | | | | |
|---|---|---|---|---|
| 2004/0246901 A1* | 12/2004 | Zhang | ............... | H04L 45/121 370/238 |
| 2005/0192011 A1* | 9/2005 | Hong | ............... | H04W 36/12 455/440 |
| 2007/0070983 A1* | 3/2007 | Redi | ............... | H04W 40/248 370/352 |
| 2007/0141984 A1* | 6/2007 | Kuehnel | ............... | H04W 4/00 455/41.2 |
| 2008/0310311 A1 | 12/2008 | Flammer et al. | | |
| 2009/0003243 A1 | 1/2009 | Vaswani et al. | | |
| 2013/0064175 A1 | 3/2013 | Pandey et al. | | |
| 2013/0086246 A1* | 4/2013 | Lee | ............... | H04W 4/203 709/223 |
| 2014/0244996 A1* | 8/2014 | Parthasarathy | ............... | H04L 63/104 713/150 |

(Continued)

FOREIGN PATENT DOCUMENTS

WO WO-2010127431 A1 11/2010

OTHER PUBLICATIONS

Athanaileas S., et al., "Optimized Service Selection for MANETs Using an AODV-Based Service Discovery Protocol", &th Annual Mediterranean Ad Hoc Networking Workshop, Jun. 30, 2006 (Jun. 30, 2006), XP055157523, 8 pages; Retrieved from the Internet: URL:http://citeseerx.ist.psu.edu/viewdoc/download;jsessionid=8F7605F4E6E54D38209DD5DCE3429A62?doi=10.1.1.73.7004&rep=rep1&type=pdf.

(Continued)

*Primary Examiner* — Mohammad Adhami
(74) *Attorney, Agent, or Firm* — Knobbe Martens Olson & Bear LLP

(57) ABSTRACT

Systems, methods, and devices for wireless service delivery are described herein. In some aspects, a method for wireless service deliver may include transmitting, by a first wireless node, and receiving, from each of a plurality of wireless nodes, a service discovery message for a service. The method may further include selecting one of the plurality of wireless nodes based on a link quality metric associated with each of the plurality of wireless nodes. The method may additionally include establishing a communication pathway to a provider of the service through a link to the selected wireless node.

26 Claims, 12 Drawing Sheets

(56) References Cited

U.S. PATENT DOCUMENTS

| | | | | |
|---|---|---|---|---|
| 2014/0321317 A1* | 10/2014 | Kasslin | ............. | H04W 4/08 370/254 |
| 2015/0127733 A1* | 5/2015 | Ding | ............. | H04W 4/08 709/204 |
| 2015/0296416 A1* | 10/2015 | Lee | ............. | H04W 8/005 370/331 |

OTHER PUBLICATIONS

International Search Report and Written Opinion—PCT/US2014/050922—ISA/EPO—Dec. 17, 2014.

Lenders V., et al., "Service Discovery in Mobile Ad Hoc Networks: A Field Theoretic Approach", World of Wireless Mobile and Multimedia Networks, 2005. WOWMOM 2005. Sixth IEEE International Symposium on a Taormina-Giardini Naxos, Italy Jun. 13-16, 2005, Piscataway, NJ, USA, IEEE, Los Alamitos, CA, USA, Jun. 13, 2005 (Jun. 13, 2005), pp. 120-130, XP010811072.

Ververidis C.N, et al., "Service discovery for mobile Ad Hoc networks, a survey of issues and techniques", IEEE Communications Surveys, IEEE, New York, NY, US, vol. 10, No. 3, Jul. 1, 2008 (Jul. 1, 2008), pp. 30-45, XP011234560, ISSN, 1553-877X, DOI, DOI,10.1109/COMST.2008.4625803.

* cited by examiner

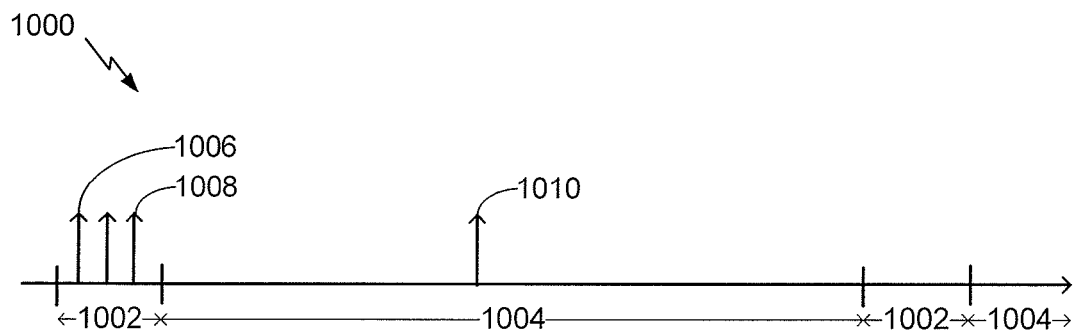
FIG. 10
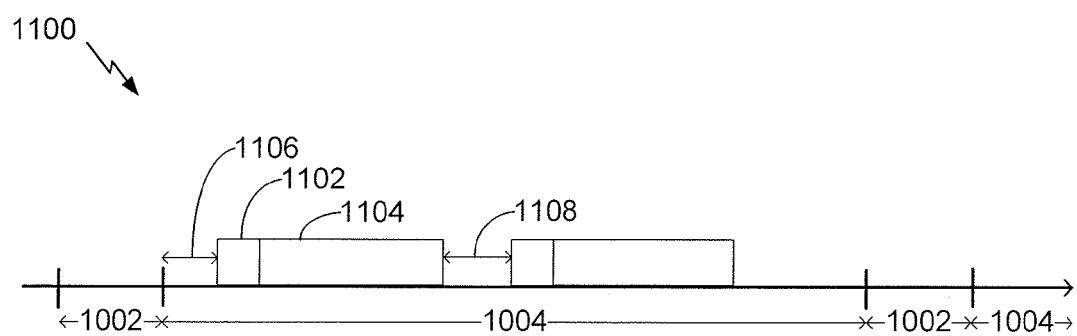
FIG. 11
| FC 1202 | Duration 1204 | A1 1206 | A2 1208 | A3 1210 | Seq. 1212 | Time 1214 | Beacon Intvl 1216 | Cap 1218 | NAN IE 1220 | FCS 1222 |
FIG. 12

SYSTEMS AND METHODS FOR CONCURRENT SERVICE DISCOVERY AND MINIMUM SPANNING TREE FORMATION FOR SERVICE DELIVERY

CLAIM OF PRIORITY UNDER 35 U.S.C. §119

The present Application for patent claims priority to Provisional Application No. 61/876,141 entitled "SYSTEMS AND METHODS FOR CONCURRENT SERVICE DISCOVERY AND MINIMUM SPANNING TREE FORMATION FOR SERVICE DELIVERY" filed Sep. 10, 2013, and assigned to the assignee hereof. Provisional Application No. 61/876,141 is hereby expressly incorporated by reference herein.

BACKGROUND

1. Field

The present application relates generally to wireless communications, and more specifically to systems, methods, and devices for service delivery and minimum spanning tree formation for service delivery.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit information to other devices in the wireless network and/or may receive information from other devices in the wireless network. For example, a station may communicate with an access point to which it is associated. In some aspects, however, a seeking device in the wireless network may be seeking a service not offered by any other device to which the seeking device can establish a direct connection. Thus, if no devices with which the seeking device is directly communicating offer a particular service, a user of the seeking device may be prevented from gaining access to the service even if that service is provided by another device outside the range of the seeking device. Thus, improved systems, methods, and devices for service delivery and minimum spanning tree formation for service delivery are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

One aspect of this disclosure provides a method of wireless service delivery. The method comprises transmitting, by a first wireless node, and receiving, from each of a plurality of wireless nodes, a service discovery message for a service. The method further comprises selecting one of the plurality of wireless nodes based on a link quality metric associated with each of the plurality of wireless nodes. The method further comprises establishing a communication pathway to a provider of the service through a link to the selected wireless node.

Another aspect of this disclosure provides an apparatus for wireless communication. The apparatus comprises a transceiver configured to transmit and receive, from a plurality of wireless nodes, a service discovery message for a service. The apparatus also includes a processor configure to select one of the plurality of wireless nodes based on a link quality metric associated with each of the plurality of wireless nodes and establish a communication pathway to a provider of the service through a link to the selected wireless node.

Another aspect of this disclosure provides an apparatus for wireless communication. The apparatus comprises means for transmitting and receiving, from a plurality of wireless nodes, a service discovery message for a service. The apparatus further comprises means for selecting one of the plurality of wireless nodes based on a link quality metric associated with each of the plurality of wireless nodes. The apparatus further comprises means for establishing a communication pathway to a provider of the service through a link to the selected wireless node.

Another aspect of this disclosure provides a non-transitory computer-readable medium comprising code that, when executed, causes an apparatus to transmit and receive, from a plurality of wireless nodes, a service discovery message for a service. The code further causes the apparatus to select one of the plurality of wireless nodes based on a link quality metric associated with each of the plurality of wireless nodes. The code further causes the apparatus to establish a communication pathway to a provider of the service through a link to the selected wireless node.

BRIEF DESCRIPTION OF THE DRAWINGS

FIG. 10 shows a timeline for example communications on a neighbor aware network channel by neighbor aware network devices as may be employed within the wireless communication system of FIGS. 1 and 3A-3F.

FIG. 11 shows a timeline for example communications on a social Wi-Fi mesh channel by neighbor aware network devices as may be employed within the wireless communication system of FIGS. 1 and 3A-3F.

FIG. 12 shows an example neighbor aware network beacon frame as may be employed within the wireless communication system of FIGS. 1 and 3A-3F.

DETAILED DESCRIPTION

Figure 1:
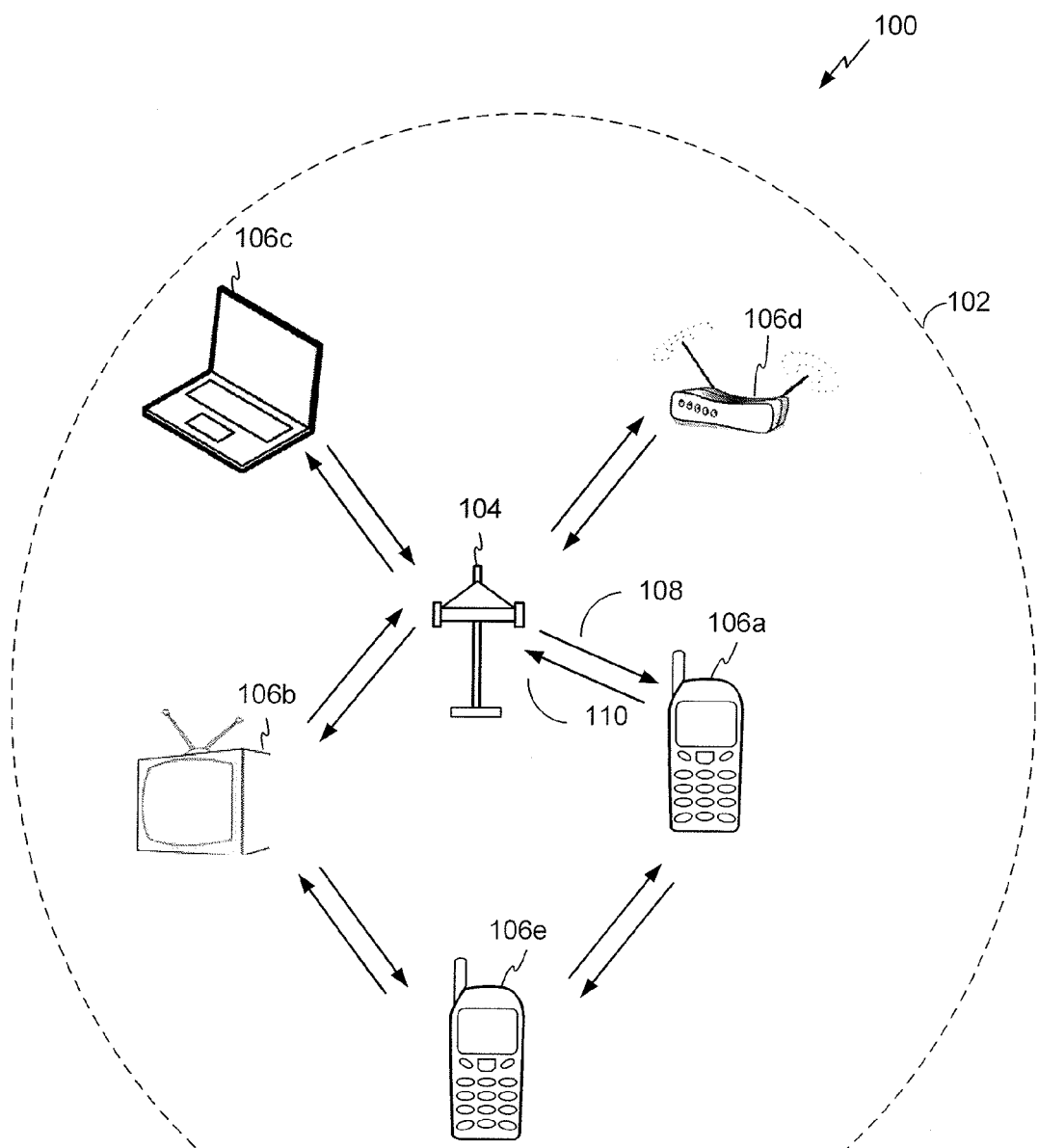
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 ah protocol or the 802.11 ac protocol using orthogonal frequency-division multiplexing (OFDM), direct-sequence spread spectrum (DSSS) communications, a combination of OFDM and DSSS communications, or other schemes. Implementations of the 802.11 ah protocol or the 802.11 ac protocol may be used for sensors, metering, and smart grid networks. Advantageously, aspects of certain devices implementing the 802.11ah protocol or the 802.11 ac protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah or 802.11ac) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, a wireless device, a wireless node, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard or the 802.11ac standard, for example. Such devices, whether used as an STA or AP or other device, may be used for smart metering or in a smart grid network. Such devices may provide sensor applications or be used in home automation.

The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard or the 802.11ac standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106 (e.g., utilizing a neighbor aware network (NAN) of wireless peer-to-peer devices). Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN). Further, one or more of the STAs 106, for example, the STA 106e may be in communication with the AP 104 through one or more other STAs, for example, the STAs 106b and/or 106a. In such a case, the STAs 106a and 106b may operate as relays for the STA 106e.

Figure 2:
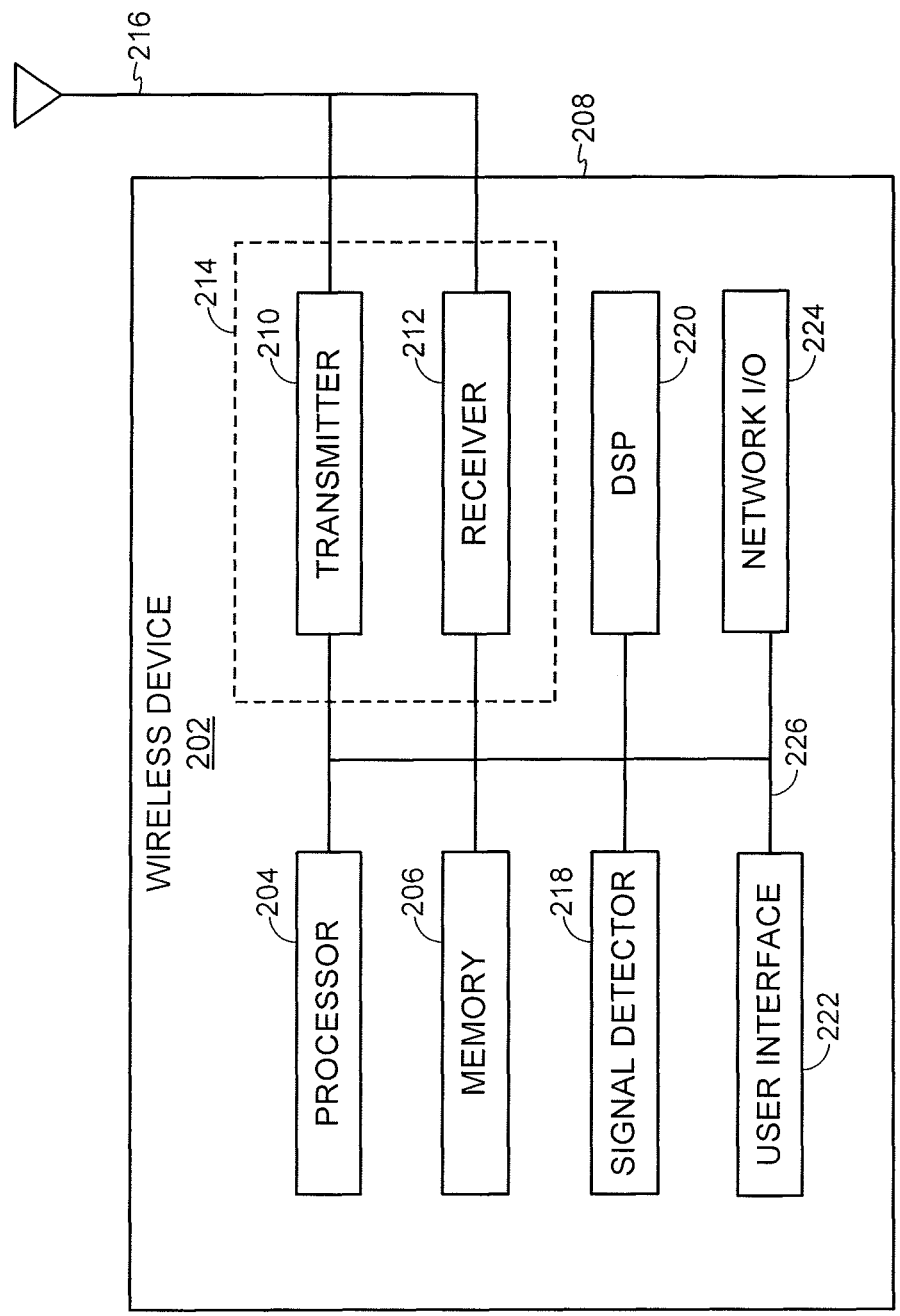
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 and/or an STA 106 and may be used to transmit and/or receive communications. That is, either the AP 104 or one of the STAa 106*a*-106*e* may serve as transmitter or receiver devices. Certain aspects contemplate the signal detector 218 being used by software running on the memory 206 and the processor 204 to detect the presence of a transmitter or receiver.

As described above, the AP 104 and the STAs 106*a*-106*e* may be configured to communicate with each other. However, in some embodiments, the AP 104 and the STAs 106*a*-106*e* may not be able to communicate properly with each other. For example, the AP 104 and the STA 106*e* may be able to communicate with each other, but at a lower than desired data rate. This may be due to interference or the distance between the AP 104 and the STA 106*e*. In another example, the AP 104 and/or the STA 106*e* may be out of a transmit range of the other such that the AP 104 and the STA 106*e* cannot communicate with each other.

Adverse consequences may result if the AP 104 and the STA 106*e* have a poor connection and/or cannot communicate with each other. For example, if no devices with which the STA 106*e* is directly communicating, for example the STAs 106*a* and 106*b*, offer a particular service, a user of the STA 106*e* may be prevented from gaining access to the service even if that service is provided by another device outside the range of the seeking device, for example, the AP 104.

To establish a connection between the AP 104 and the STA 106*e* so that each device can communicate with each other, another device, such as a relay, may be utilized. The relay may form a bridge between the AP 104 and the STA 106, thus serving as an intermediary device that allows the AP 104 and the STA 106 to communicate properly with each other (e.g., communicate at a desired data rate). However, the STA 106*a* and/or 106*b* chosen by the AP 104 or the STA 106*e* to serve as a relay may suffer from the same problems as the AP 104 and/or the STA 106*e*. For example, the relay STA 106*a* and/or 106*b*, while having a stronger connection with the AP 104 than the STA 106*e* (e.g., the relay STA 106*a* and/or 106*b* can communicate with the AP 104 at a higher data rate than the STA 106*e*), may still only be able to communicate with the AP 104 at a lower than desired data rate. In another example, the relay STA 106*a* and/or 106*b*, while at one point being able to communicate with the AP 104 and/or the STA 106*e*, may no longer be able to do so.

Thus, a multi-hop relay network may be introduced to ensure that the STA 106*e* and the AP 104 can communicate with each other. In a multi-hop relay network, one or more relay devices may form a bridge between the AP 104 and the STA 106*e*. For example, the STA 106*e* may select a first device to serve as a first relay that relays packets to and from the STA 106*e*. The first device may in turn select a second device to serve as a second relay that relays packets to and from the first device. The second device may then select a third device to serve as a third relay that relays packets to and from the second device. Alternatively, if the second device and the AP 104 can communicate at a desired data rate, the second device may instead communicate directly with the AP 104. Thus, the STA 106*e* and the AP 104 may communicate with each other indirectly at a desired data rate. Moreover, as previously stated, in some implementations, the AP 104 may not represent an access point, but instead may function as an additional station, such as when the network 100 is a NAN and each of the STAs 106 (and the AP 104) are configured to participate in peer-to-peer communications as NAN devices. Multi-hop relay networks are described in greater detail herein with respect to FIGS. 3A-3E.

Figure 3A:
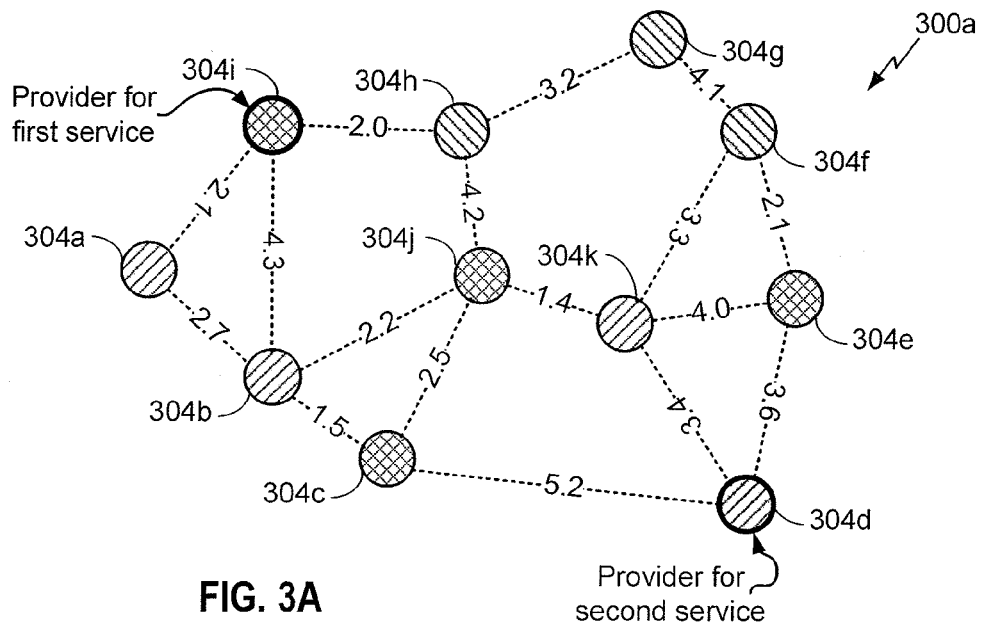
FIGS. 3A-3F illustrate a wireless communications system comprising a plurality of wireless devices for providing service delivery and minimum spanning tree formation for service delivery.

FIG. 3A illustrates a wireless communications system comprising a plurality of wireless devices for providing service delivery and minimum spanning tree formation for service delivery. FIG. 3A illustrates a wireless communications system 300*a* comprising wireless devices 304*a*-304*k*. While eleven wireless devices are illustrated, the wireless communications system 300*a* may comprise any number of wireless devices. Furthermore, any of the wireless devices 304*a*-304*k* may correspond to either the AP 104 or any of the STAs 106*a*-106*e* as previously discussed in FIG. 1. Each wireless device in the wireless communications system 300*a* may not be able to communicate directly with each other wireless device. Thus, the present application discloses a distributed mechanism to perform service discovery over multiple hops, from one wireless device to another wireless device. In the process, an efficient, minimum spanning service delivery tree may be formed for delivery of desired content by interconnecting links between wireless devices for the delivery of the desired content.

To ensure each branch of the tree has the best possible link quality, one or more link metrics characterizing potential links between neighboring wireless devices may be considered in forming such a minimum spanning service delivery tree. Such link metrics may depend on several factors including but not limited to a distance between wireless devices, a bit error rate associated with the link, a received signal strength indicator (RSSI) associated with the link, a signal to noise ratio associated with the link, a mobility of one or both of the wireless devices in the link, and even a battery life of one or both of the wireless devices. In order to distinguish the quality of one potential connection to one wireless device and another potential connection to another wireless device, a link weight may be assigned to each link. The link weight may be determined as a weighted sum of any of the previously mentioned factors or link metrics.

Examples of such link weights are shown between the wireless devices 304a-304k of FIG. 3A. Such link weight values are relative to one another and do not necessarily correspond to a particular unit of measure. However, as shown, lower link weights correspond to better overall link quality. For example, a node with the least mobility, highest battery strength and good signal quality may be preferred and would result in a relatively low link weight for an associated link. Although the examples described below assume symmetrical link weights for a link, i.e., a link between two wireless devices will have the same link weight as seen from either side of the link, in practice, a link need not have link weight symmetry. For example, one of the wireless devices may have a higher or lower battery strength or a higher or lower mobility than the other wireless device on the link and thus may present a different link weight.

In FIG. 3A, the wireless device 304i may be a provider of a first service, while the wireless device 304d may be a provider of a second service. As shown, the wireless devices 304a, 304b, 304c, 304d, 304e, 304i, 304j and 304k may each be seeking the first service. The wireless devices 304c, 304e, 304f, 304g, 304h, 304i and 304j may each be seeking the second service. Each of the wireless devices 304a-304k may have a designated level of 0 and be considered as a separate fragment before any links are formed in any particular service delivery tree. A listing of exemplary links available to each of the wireless devices in FIG. 3A follows. The wireless device 304a may link to the wireless device 304i over a link having weight 2.1 or to the wireless device 304b over a link having weight 2.7. The wireless device 304b may further link to the wireless device 304i over a link having weight 4.3, to the wireless device 304j over a link having weight 2.2, and to the wireless device 304c having weight 1.5. The wireless device 304c may further link to the wireless device 304j over a link having weight 2.5, and to the wireless device 304d over a link having weight 5.2. The wireless device 304d may further link to the wireless device 304k over a link having weight 3.4 and the wireless device 304e over a link having a weight of 3.6. The wireless device 304e may further link to the wireless device 304k over a link having weight 4.0 and the wireless device 304f over a link having a weight of 2.1. The wireless device 304f may further link to the wireless device 304g over a link having weight 4.1 and the wireless device 304k over a link having a weight of 3.3. The wireless device 304g may further link to the wireless device 304h over a link having weight 3.2. The wireless device 304h may further link to the wireless device 304j over a link having weight 4.2 and the wireless device 304i over a link having a weight of 2.0. The wireless device 304j may further link to the wireless device 304k over a link having weight 1.4.

Because not all of the wireless devices 304a-304k may communicate with each other, and because different wireless devices are seeking different services, a service delivery tree may be constructed for each service to efficiently deliver that service to each seeking wireless device. In order to ensure construction of the most efficient service delivery tree having the highest possible link qualities between wireless nodes, each wireless device may link with a neighboring wireless device seeking the same service and having the lowest available link weight. Such devices may link to form a fragment and then continue the search for a providing wireless device or node by linking the fragment to other wireless devices and/or fragments of linked wireless devices along mutually lowest weighted links until a provider wireless device is found. In order to ensure the service delivery tree is minimum spanning, two wireless nodes and/or fragments may only link together along mutually agreed low weight links. In other words, a link will only be formed where that link is the lowest weight link available to both of the wireless nodes or fragments seeking the connection for the same service. Such formation of fragments may be further described in connection with FIG. 3B below.

Figure 3B:
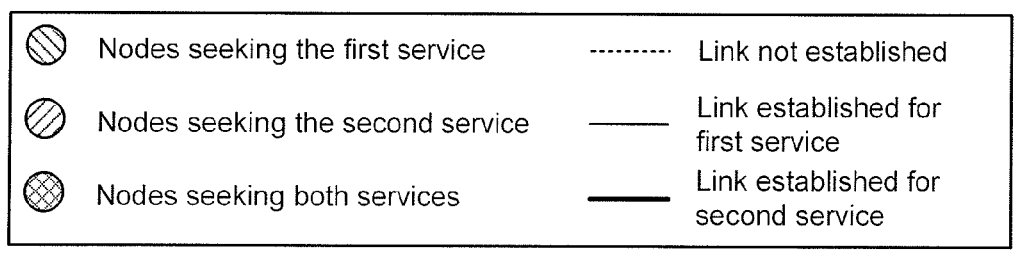
Figure 3B:
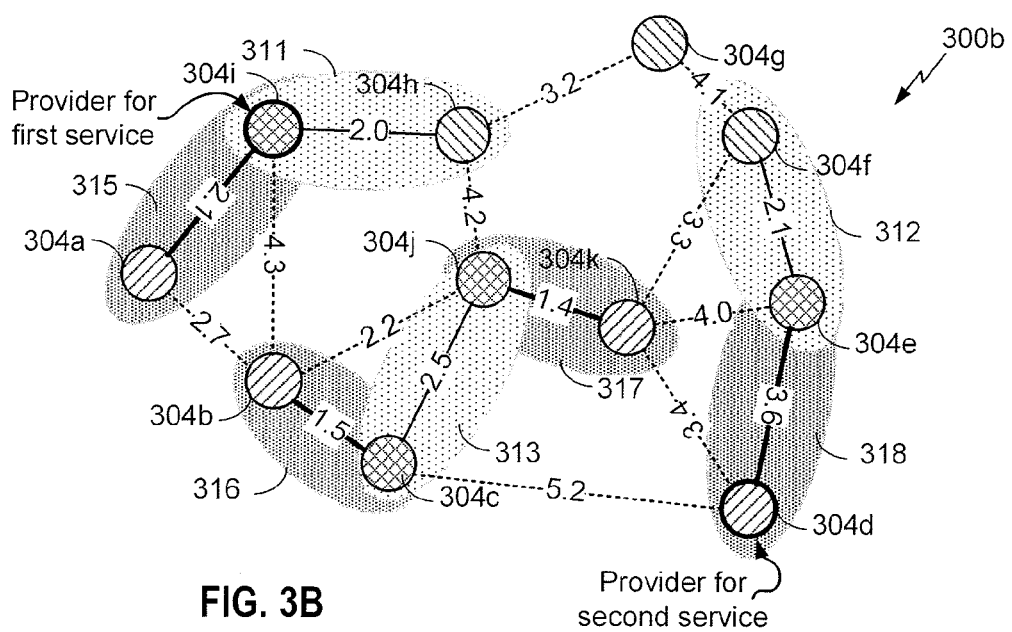

FIG. 3B illustrates a wireless communications system 300b comprising a plurality of wireless devices for providing service delivery and minimum spanning tree formation for service delivery. In FIG. 3B, a service delivery tree comprising one or more intermediate wireless devices must be formed in order for the first service to be delivered from the wireless device 304i to each of the wireless devices 304a, 304b, 304c, 304d, 304e, 304i, 304j and 304k. Similarly, a service delivery tree comprising one or more intermediate wireless devices must be formed in order for the second service to be delivered from the wireless device 304d to each of the wireless devices 304c, 304e, 304f, 304g, 304h, 304i and 304j. To form such a tree, each of the wireless devices 304a-304k may actively seek a neighboring wireless device looking for the same service and having the mutually lowest available link weight.

For the wireless devices 304a and 304i, the mutually lowest link weight associated with the second service is 2.1. Thus, a fragment 315 including the wireless device 304a and the wireless device 304i is formed in the second service delivery tree. For the wireless devices 304b and 304c, the mutually lowest link weight associated with the second service is 1.5. Thus, a fragment 316 including the wireless device 304b and the wireless device 304c is also formed in the second service delivery tree. For the wireless devices 304d and 304e, the mutually lowest link weight associated with the second service is 3.6. Thus, a fragment 318 including the wireless device 304d and the wireless device 304e is also formed in the second service delivery tree. The reason the wireless device 304d does not link to the wireless device 304k for the second service is because the wireless device 304k has a lower link weight than 3.4 (associated with the wireless device 304d) associated with the wireless device 304j (1.4). Thus, at the first level of fragment production as shown in FIG. 3B, a fragment 317 including the wireless device 304j and the wireless device 304k is also formed in the second service delivery tree. Likewise, the reason the wireless device 304e does not link to the wireless device 304f along the link having weight 2.1 is because the wireless device 304f is not seeking the second service. Thus, at this point in the second service delivery tree, each wireless device seeking the second service has successfully identified another wireless device also seeking the second service and having a mutually lowest link weight. After merging, each of the fragments 315-318 may have a level incremented by one to 1 from the solitary wireless device value of 0. However, it is not necessarily the case that each wireless device in a network will always find another wireless device also seeking the same service and having a mutually lowest link weight in each discovery step, as will be seen with respect to the fragment formation with respect to the first service described below.

Continuing with FIG. 3B, for the wireless devices 304c and 304j, the mutually lowest link weight associated with the first service is 2.5. Thus, a fragment 313 including the wireless device 304c and the wireless device 304j is formed in the first service delivery tree. For the wireless devices 304e and 304f, the mutually lowest link weight associated with the first service is 2.1. Thus, a fragment 312 including the wireless device 304e and the wireless device 304f is formed in the first service delivery tree. For the wireless devices 304*h* and 304*i*, the mutually lowest link weight associated with the first service is 2.0. Thus, a fragment 311 including the wireless device 304*h* and the wireless device 304*i* is formed in the first service delivery tree. After merging, each of the fragments 311-313 may have a level incremented by one to 1 from the solitary wireless device value of 0. At this point, the wireless device 304*g* has not linked with another wireless device seeking the first service. This is because the wireless device 304*g* is not the lowest weight link for either of the only two available devices for linking, the wireless devices 304*f* and 304*h*. More importantly, the wireless devices 304*c*, 304*e*, 304*f*, 304*g*, and 304*j* are not yet able to receive the first service from the wireless device 304*i* providing the first service. Likewise, the wireless devices 304*a*, 304*b*, 304*c*, 304*i*, 304*j* and 304*k* are not yet able to receive the second service from the wireless device 304*d* providing the second service. Thus, the discovery and service delivery tree formation process should continue in order for each wireless device to receive the appropriate services.

Figure 3C:
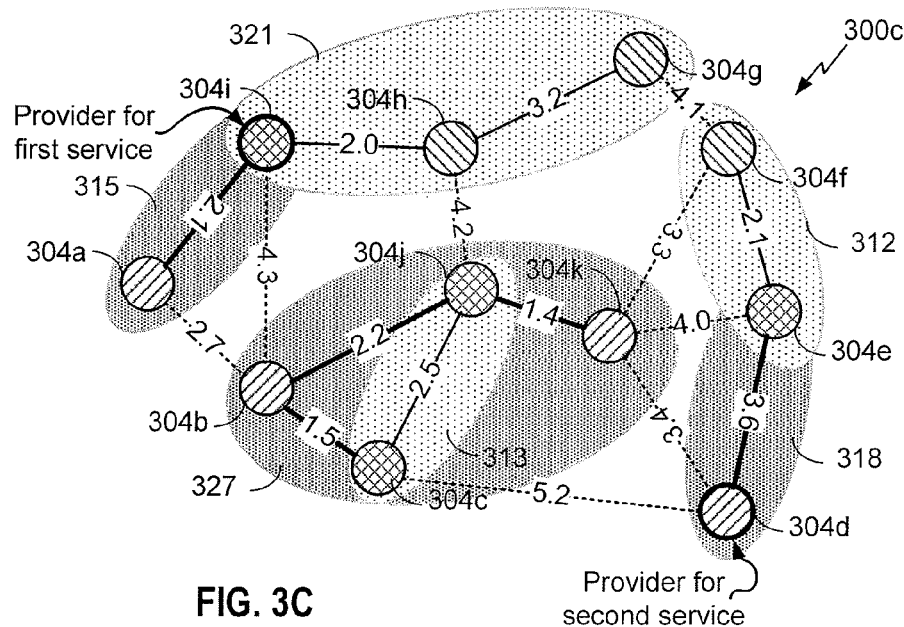

FIG. 3C illustrates a wireless communications system 300*c* comprising a plurality of wireless devices for providing service delivery and minimum spanning tree formation for service delivery. In FIG. 3C, the service delivery tree comprising one or more intermediate wireless devices should continue to be formed in order for the second service to be delivered from the wireless device 304*d* to each of the wireless devices 304*a*, 304*b*, 304*c*, 304*i*, 304*j* and 304*k*. Similarly, a service delivery tree comprising one or more intermediate wireless devices should be formed in order for the first service to be delivered from the wireless device 304*i* to each of the wireless devices 304*c*, 304*e*, 304*f*, 304*g* and 304*j*. As continued from FIGS. 3A-3B, each of the wireless devices 304*a*-304*k* may continue to actively seek neighboring wireless devices or fragments of devices looking for the same service and having the mutually lowest available link weight to that solitary wireless device or, where devices are already merged in a fragment, available to any device in the entire fragment of wireless devices.

For example, the fragment 316 of FIG. 3B has 5 possible links from which to consider another connection: a link from the wireless device 304*b* to the wireless device 304*a* having weight 2.7, a link from the wireless device 304*b* to the wireless device 304*i* having weight 4.3, a link from the wireless device 304*b* to the wireless device 304*j* having weight 2.2, a link from the wireless device 304*c* to wireless device 304*j* having weight 2.5, and a link from the wireless device 304*c* to wireless device 304*d* having weight 5.2. For the fragment 316, the mutually lowest link weight associated with the second service is 2.2. This is also the lowest weight link of the six link choices available to fragment 317. Thus, the fragments 316 and 317 may be linked and merged to form a fragment 327 including the wireless devices 304*b*, 304*c*, 304*j* and 304*k* in the second service delivery tree. The level of the fragment 327 may be incremented by one to 2. In this example, because fragments only connect to additional wireless devices or fragments along the mutually lowest weighted link, and because the only two fragments not yet merged in FIG. 3C (the fragments 315 and 318) cannot communicate directly with one another, neither of the fragments 315 and 318 will merge with one another or with the fragment 327 in this step.

Turning to the first service delivery tree, although the fragment 311 has four possible links to choose from, only two of them are to wireless devices seeking the first service. Thus, the possible links from which to consider another connection, for the fragment 311, are the links from the wireless device 304*h* to wireless device 304*g* having weight 3.2 and from the wireless device 304*h* to wireless device 304*j* having weight 4.2. For the fragment 311, the mutually lowest link weight associated with the first service is 3.2. This is also the lowest weight link of the two link choices available to the wireless device 304*g*. Thus, the fragment 311 and the wireless device 304*g* may be linked and merge to form a fragment 321 including the wireless devices 304*g*-304*i* in the first service delivery tree. The level of the fragment 321 may be incremented by one to 2. The wireless devices 304*c*, 304*e*, 304*f* and 304*j* are still not yet able to receive the first service from the wireless device 304*i*. Likewise, the wireless devices 304*a*, 304*b*, 304*c*, 304*i*, 304*j* and 304*k* are still not yet able to receive the second service from the wireless device 304*d*. Thus, the discovery and service delivery tree formation process should continue in order for each wireless device to receive the appropriate services.

Figure 3D:
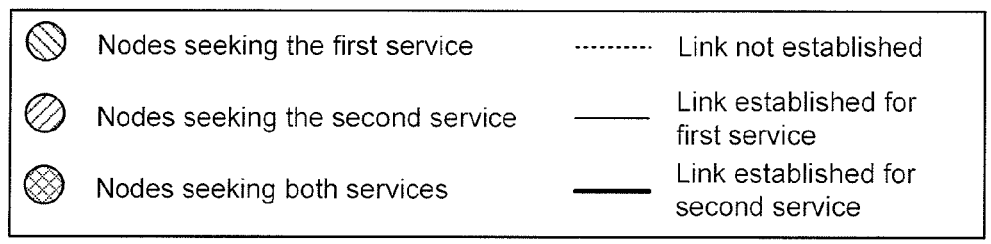
Figure 3D:
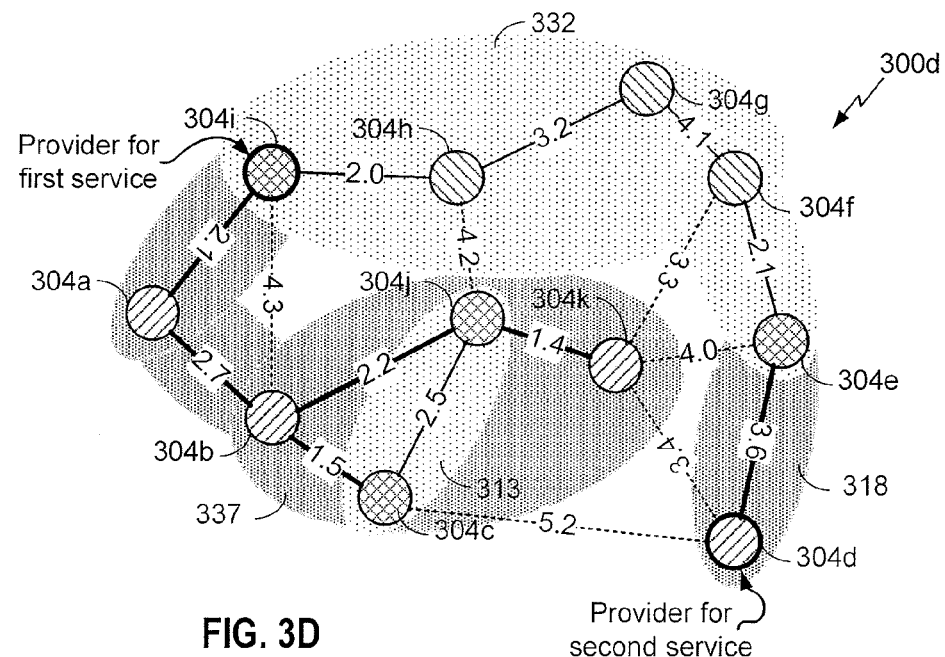

FIG. 3D illustrates a wireless communications system 300*d* comprising a plurality of wireless devices for providing service delivery and minimum spanning tree formation for service delivery. In FIG. 3D, the service delivery tree comprising one or more intermediate wireless devices should continue to be formed in order for the second service to be delivered from the wireless device 304*d* to each of the wireless devices 304*a*, 304*b*, 304*c*, 304*i*, 304*j* and 304*k*. Similarly, a service delivery tree comprising one or more intermediate wireless devices should be formed in order for the first service to be delivered from the wireless device 304*i* to each of the wireless devices 304*c*, 304*e*, 304*f*, and 304*j*. As continued from FIGS. 3A-3C, each of the wireless devices 304*a*-304*k* may continue to actively seek neighboring wireless devices or fragments of devices looking for the same service and having the mutually lowest available link weight to that solitary wireless device or available to any device in the entire fragment of wireless devices.

For example, the fragment 327 of FIG. 3C has 5 possible links from which to consider another connection: a link from the wireless device 304*b* to the wireless device 304*a* having weight 2.7, a link from the wireless device 304*b* to the wireless device 304*i* having weight 4.3, a link from the wireless device 304*c* to wireless device 304*d* having weight 5.2, a link from the wireless device 304*k* to wireless device 304*e* having weight 4.0, and a link from the wireless device 304*k* to wireless device 304*d* having weight 3.4. For the fragment 327, the mutually lowest link weight associated with the second service is 2.7. This is also the lowest weight link of the two link choices available to fragment 315. Thus, the fragments 327 and 315 may be linked and merged to form a fragment 337 including the wireless devices 304*a*, 304*b*, 304*c*, 304*i*, 304*j* and 304*k* in the second service delivery tree. The level of the fragment 337 may be incremented by one to 3.

Turning to the first service delivery tree, although the fragment 312 has four possible links to choose from, only one of them is to wireless devices seeking the first service. Thus, the mutually lowest link weight associated with the first service is 4.1 between the wireless device 304*f* and the wireless device 304*g* in fragment 321. This is also the lowest weight link of the two link choices available to the fragment 321. Thus, the fragment 312 and the fragment 321 may be linked and merge to form a fragment 332 including the wireless devices 304*e*-304*i* in the first service delivery tree. The level of the fragment 332 may be incremented by one to 3. However, the wireless devices 304*c* and 304*j* are still not yet able to receive the first service from the wireless device 304*i*. Likewise, the wireless devices 304*a*, 304*b*, 304c, 304i, 304j and 304k are still not yet able to receive the second service from the wireless device 304d. Thus, the discovery and service delivery tree formation process should continue in order for each wireless device to receive the appropriate services.

Figure 3E:
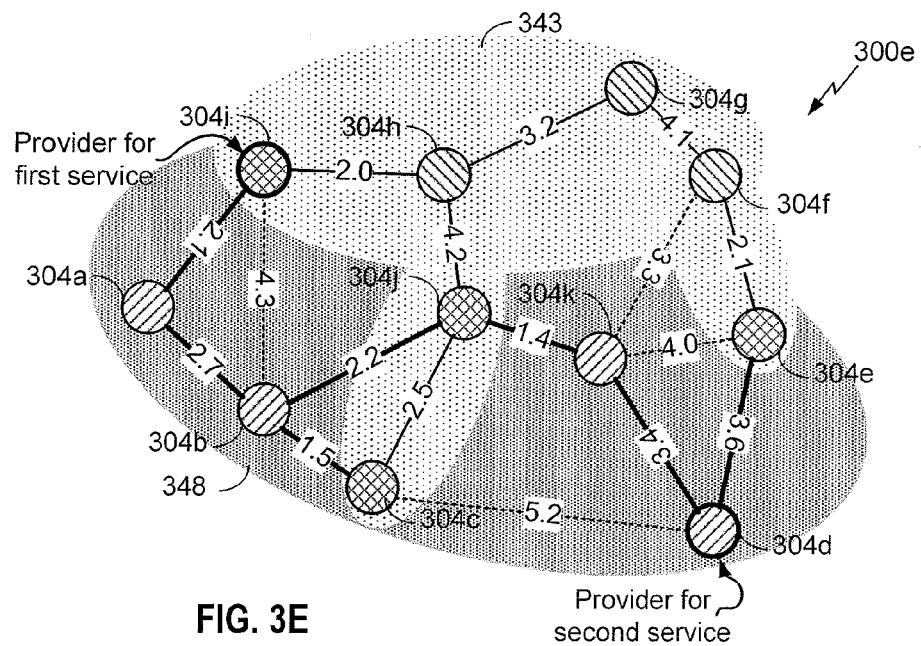

FIG. 3E illustrates a wireless communications system 300e comprising a plurality of wireless devices for providing service delivery and minimum spanning tree formation for service delivery. In FIG. 3E, the service delivery tree comprising one or more intermediate wireless devices should continue to be formed in order for the second service to be delivered from the wireless device 304d to each of the wireless devices 304a, 304b, 304c, 304i, 304j and 304k. Similarly, a service delivery tree comprising one or more intermediate wireless devices should be formed in order for the first service to be delivered from the wireless device 304i to each of the wireless devices 304c and 304j. As continued from FIGS. 3A-3D, each of the wireless devices 304a-304k may continue to actively seek neighboring wireless devices or fragments of devices looking for the same service and having the mutually lowest available link weight to that solitary wireless device or available to any device in the entire fragment of wireless devices.

For example, the fragment 337 of FIG. 3D has 3 possible links from which to consider another connection: a link from the wireless device 304b to wireless device 304d having weight 5.2, a link from the wireless device 304k to wireless device 304d having weight 3.4, and a link from the wireless device 304k to wireless device 304e having weight 4.0. For the fragment 337, the mutually lowest link weight associated with the second service is 3.4. This is also the lowest weight link of the same three link choices available to fragment 318. Thus, the fragments 337 and 318 may be linked and merged to form a fragment 348 including the wireless devices 304a, 304b, 304c, 304i, 304j and 304k in the second service delivery tree. The level of the fragment 348 may be incremented by one to 4.

Turning to the first service delivery tree, although the fragment 313 has only one link to another fragment seeking the first service to choose from. Thus, the mutually lowest link weight associated with the first service is 4.2 between the wireless device 304h in fragment 332 and the wireless device 304j in fragment 313. This is also the lowest weight link of the two link choices available to the fragment 332. Thus, the fragment 313 and the fragment 332 may be linked and merge to form a fragment 343 including the wireless devices 304c and 304e-304j in the first service delivery tree. The level of the fragment 343 may be incremented by one to 4. At this stage, each of the wireless devices 304c and 304e-304j may be able to receive the first service from the wireless device 304i, either directly or via access provided by one or more intermediate wireless devices. Likewise, each of the wireless devices 304a-304e and 304i-304k may be able to receive the second service from the wireless device 304d, either directly or via access provided by one or more intermediate wireless devices. Thus, the service discovery and service delivery tree formation may end when each of the wireless devices and/or fragments come into communication with either a wireless device directly providing the service, or with another wireless device already in a communication path to a wireless device directly providing the service. Moreover, because each link for each service delivery tree was the mutually lowest weight link available, the service delivery tree will include only the highest quality links and will thus be a minimum spanning service delivery tree. An advantage of the previously described formation of the minimum spanning tree for service delivery is that the routing of at least one path for communication of the first and/or second services is performed concurrently with searching for the wireless devices that either provide or seek the first and/or second services, thus eliminating the separate routing process. Because wireless devices merge into fragments where all included devices request the service, it is desirable that there exists at least one path between the wireless devices requesting a particular service and the provider of that service. The traffic flow for each of the first and second service delivery trees will now be described in connection with FIG. 3F.

Figure 3F:
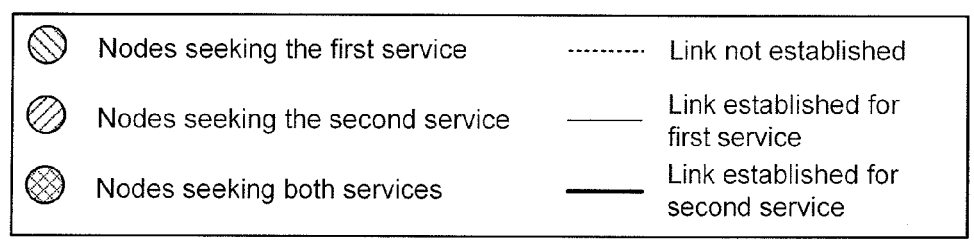

FIG. 3F illustrates a wireless communications system 300f comprising a plurality of wireless devices for providing service delivery and minimum spanning tree formation for service delivery. As shown in FIG. 3F, all wireless devices have at least one link to another wireless device seeking the same service such that the links branch out to the respective wireless device providing the respective service. For example, the first service may be communicated from the wireless device 304i to the wireless device 304h, where the service is split off and communicated through the wireless device 304h to both the wireless device 304j and the wireless device 304g. The wireless device 304j may provide access to the first service for the wireless device 304c. The wireless device 304g may provide access to the first service for the wireless device 304f, which may provide access to the first service for the wireless device 304e. The second service may be communicated from the wireless device 304d to both the wireless device 304e and the wireless device 304k. The wireless device 304k may provide access to the second service for the wireless device 304j which may provide access to the second service for the wireless device 304b. The wireless device 304b may provide access to the second service for the wireless device 304c and for the wireless device 304a, which may provide access to the second service for the wireless device 304i. For the purposes of this application, the term "social Wi-Fi" may be used interchangeably with the term "NAN." Moreover, the wireless devices of the wireless devices 304a-304k seeking, providing or participating in the same service (e.g., either the first or second services) may form a social Wi-Fi mesh (e.g., a NAN data path) for delivery of the service(s). The wireless devices of the wireless devices 304a-304k that seek, provide, or participate in the same service may be considered social Wi-Fi "mesh devices" belonging to the same social Wi-Fi mesh (e.g., "mesh group" or "data path group"). Devices of a particular "social Wi-Fi mesh" may comprise a subset of all wireless devices within the NAN or NAN cluster. For example, all NAN devices in a particular NAN may be associated with that NAN and only a subset of those NAN devices may seek, provide or participate in the first and/or second services as described above. Moreover, devices of a particular "mesh group" may share a paging window, as will be described in more detail in connection with FIGS. 10 and 11 below, and may additionally share common security credentials, which may restrict access to the particular "mesh group" and utilization of the mesh group data path.

As fragments merge, the wireless devices may exchange messages informing the other wireless devices within the fragment about their available connections and corresponding link weights. Exemplary messages and information that may be exchanged during the discovery and merging process disclosed in connection with FIGS. 3A-3F may be understood in greater depth as described in FIG. 4 below.

Figure 4:
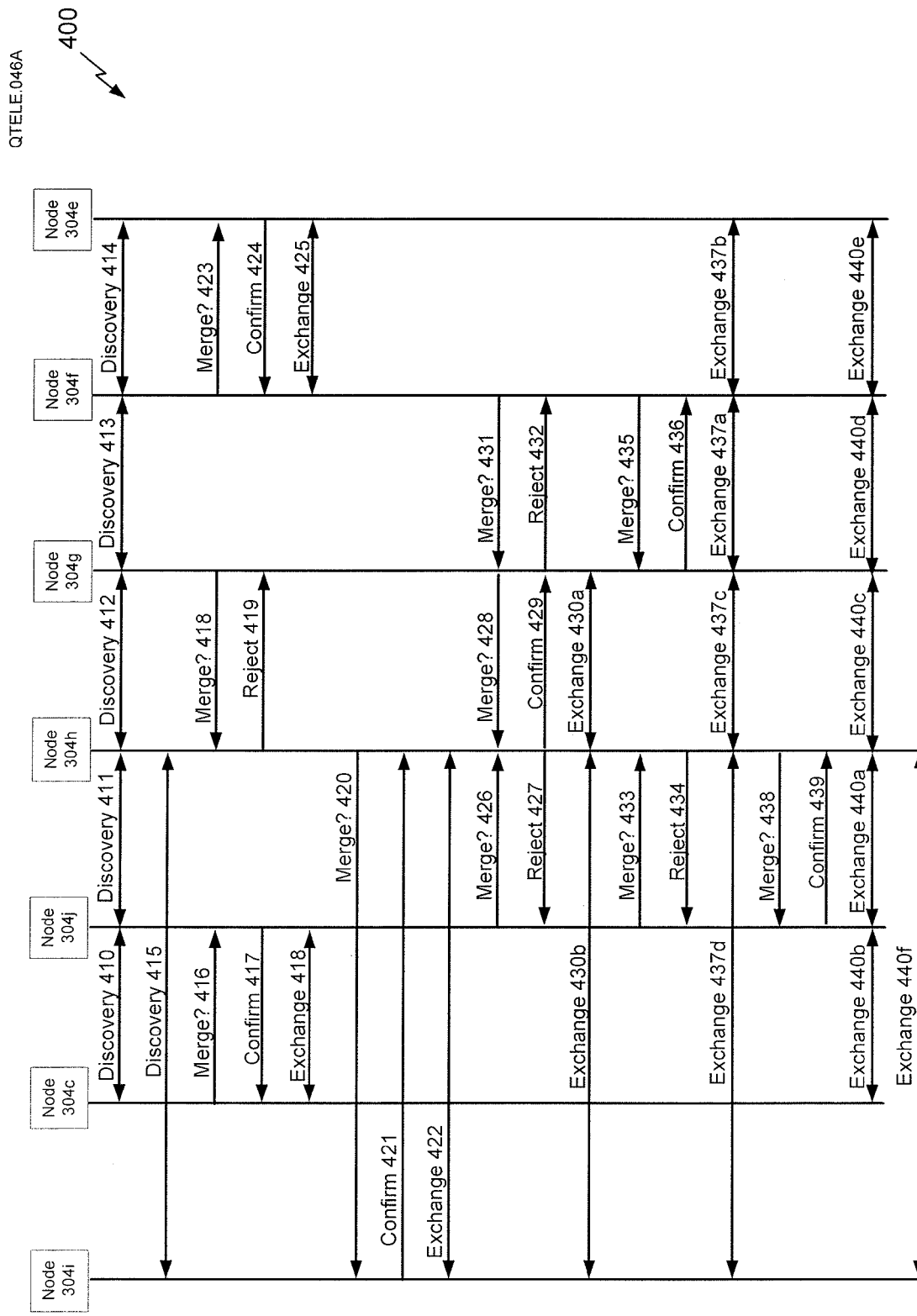
FIG. 4 shows a call flow diagram for providing service delivery and minimum spanning tree formation for service delivery in the wireless communications system of FIGS. 1 and 3A-3F.

FIG. 4 shows a call flow diagram for providing service delivery and minimum spanning tree formation for service delivery in the wireless communications system of FIGS. 1 and 3A-3F. For example, the call flow diagram 400 may describe communications that may take place between one or more of the wireless devices 304a-304k seeking a first service, as described in connection with FIGS. 3A-3F. Call flow diagram 400 may include wireless nodes 304i, 304c, node 304j, node 304h, node 304g, node 304f, and node 304e, which may correspond to the wireless devices 304i, 304j, 304h, 304g, 304f and 304e of FIGS. 3A-3F, respectively.

As previously described in connection with FIGS. 3A-3F, each of the nodes 304c, 304j, 304h, 304g, 304f, and 304e may seek a first service, while the node 304i may provide the first service. Thus, each of the nodes 304c, 304j, 304h, 304g, 304f, and 304e may broadcast a service discovery message to neighboring wireless nodes including an indication (e.g., a flag indication) that the first service is desired and that the broadcasting device is willing to collaborate with other devices (e.g., the other subscribers 304c, 304j, 304h, 304g, 304f and 304e) desiring the first service to discover a provider of the first service (e.g., the node 304i). The service discovery messages may additionally include one or more link metrics associated with the broadcasting wireless node that the receiving wireless node may not be aware of or may not be able to easily measure, as previously described in connection with FIG. 3A. For example, such link metrics may depend on several factors including but not limited to a distance between wireless devices, a bit error rate, a signal to noise ratio, a mobility of the broadcasting wireless node, and a battery life of the broadcasting wireless node. Coinciding with neighboring wireless devices for each wireless device seeking the first service, as shown in FIGS. 3A-3F, discovery messages may be exchanged as shown by the discovery communications 411 through 415. Once the nodes 304c and 304e-304j have communicated and received the discovery messages, each of the nodes 304c and 304e-304j may calculate the weighted link value for each wireless node based on a weighted sum of the link metrics. The wireless node 304c may determine a link to the wireless node 304j to have the lowest link weight and may send a merge request signal 416 (e.g., for forming a "loose association" with the wireless node 304j). Because the link to the wireless node 304c is also the lowest weight link for the wireless node 304j, the wireless node 304j may send a merge confirm signal 417. The wireless nodes 304c and 304j may merge into a one fragment, for example, the fragment 313 of FIG. 3B, and exchange a list of neighboring wireless nodes along with previously calculated link weights associated with those neighboring wireless nodes in the exchange signal 418. In this way, all wireless nodes merged into a fragment may be aware of all link weights for all wireless nodes neighboring the wireless nodes in the fragment. This allows subsequent merge operations to only merge along the lowest link weight link available to any of the wireless nodes in the fragment.

Similarly, the wireless node 304g may determine the wireless node 304h has the lowest link weight and may send a merge request signal 418. However, because the link to the wireless node 304g does not have the lowest link weight available to the wireless node 304h, the wireless node 304h sends a merge reject signal 419. The wireless nodes 304g and 304h will not link at this time. However, because the link to the wireless node 304i is the lowest weight link for the wireless node 304h, the wireless node 304h may send a merge request signal 420. Because the link to the wireless node 304h is also the lowest weight link for the wireless node 304i, the wireless node 304i may send a merge confirm signal 421. The wireless nodes 304h and 304h may merge into a one fragment, for example the fragment 311 of FIG. 3B, and exchange a list of neighboring wireless nodes along with previously calculated link weights associated with those neighboring wireless nodes in an exchange signal 422.

The wireless node 304f may determine the link to the wireless node 304e has the lowest link weight and may send a merge request signal 423. Since the link to the wireless node 304f is also the lowest weight link for the wireless node 304e, the wireless node 304e may send a merge confirm signal 424. The wireless nodes 304e and 304f may merge into a one fragment, for example, the fragment 312 of FIG. 3B, and exchange a list of neighboring wireless nodes along with previously calculated link weights associated with those neighboring wireless nodes in an exchange signal 425. At this point the wireless nodes 304c and 304e-304j may have the fragment relationship as shown in FIG. 3B with respect to the first service.

At this point in the call flow diagram 400, the wireless node 304j may determine that the link to wireless node 304h is the lowest weight link available to the fragment 313 and may send a merge request signal 426. However, because the link to the wireless node 304j does not have the lowest link weight available to the fragment 311, wireless node 304h sends a merge reject signal 427. The wireless nodes 304j and 304h will not link at this time. Likewise, the wireless node 304f may determine that the link to wireless node 304g is the lowest weight link available to the fragment 312 and may send a merge request signal 431. However, because the link to the wireless node 304f does not have the lowest link weight available to the wireless node 304g, the wireless node 304g sends a merge reject signal 432. The wireless nodes 304f and 304g will not link at this time. However, because the link to the wireless node 304h is the lowest weight link for the wireless node 304g, the wireless node 304g may send a merge request signal 428. Because the link to the wireless node 304g is also the lowest weight link available for the fragment 311, the wireless node 304h may send a merge confirm signal 429. The wireless nodes 304g and 304h (part of the fragment 311) may merge into a one fragment, for example the fragment 321 of FIG. 3C, and exchange a list of neighboring wireless nodes along with previously calculated link weights associated with those neighboring wireless nodes in exchange signals 430a and 430b. At this point the wireless nodes 304c and 304e-304j may have the fragment relationship as shown in FIG. 3C with respect to the first service.

At this point in the call flow diagram 400, the wireless node 304j may again determine that the link to wireless node 304h is the lowest weight link available to the fragment 313 and may send a merge request signal 431. However, because the link to the wireless node 304j does not have the lowest link weight available to the fragment 321, the wireless node 304h sends a merge reject signal 433. The wireless nodes 304j and 304h will not link at this time. However, because the link to the wireless node 304g is the lowest weight link available to the fragment 312, and for the wireless node 304f, the wireless node 304f may send a merge request signal 435. Because the link to the wireless node 304f is also the lowest weight link available for the fragment 321, the wireless node 304g may send a merge confirm signal 436. The wireless nodes 304f (part of fragment 312) and 304g (part of the fragment 321) may merge into a one fragment, for example the fragment 332 of FIG. 3D, and exchange a list of neighboring wireless nodes along with previously calculated link weights associated with those neighboring wireless nodes in exchange signals 437a-437d. At this point the wireless nodes 304c and 304e-304j may have the fragment relationship as shown in FIG. 3D with respect to the first service.

At this point in the call flow diagram 400, the wireless node 304j may again determine that the link to wireless node 304h is the lowest weight link available to the fragment 313 and may send a merge request signal 438. Since the link to the wireless node 304j is also the lowest weight link available for the fragment 332, the wireless node 304h may send a merge confirm signal 439. The wireless nodes 304j (part of fragment 313) and 304h (part of the fragment 332) may merge into a one fragment, for example the fragment 343 of FIG. 3E, and exchange a list of neighboring wireless nodes along with previously calculated link weights associated with those neighboring wireless nodes in exchange signals 440a-440f. At this point the wireless nodes 304c and 304e-304j may have the fragment relationship as shown in FIG. 3E with respect to the first service. The first service may now be delivered to each of the wireless nodes 304c, 304e-304h and 304j from the wireless node 304i. Moreover, the links used to deliver the first service to each wireless node are the highest quality links available at the time of delivery because the service delivery tree is a minimum spanning tree as described above. The process described above regarding FIG. 4 may be configured to be performed at periodic intervals to account for network dynamics such as changing node mobility, location and battery conditions, for example.

Figure 5:
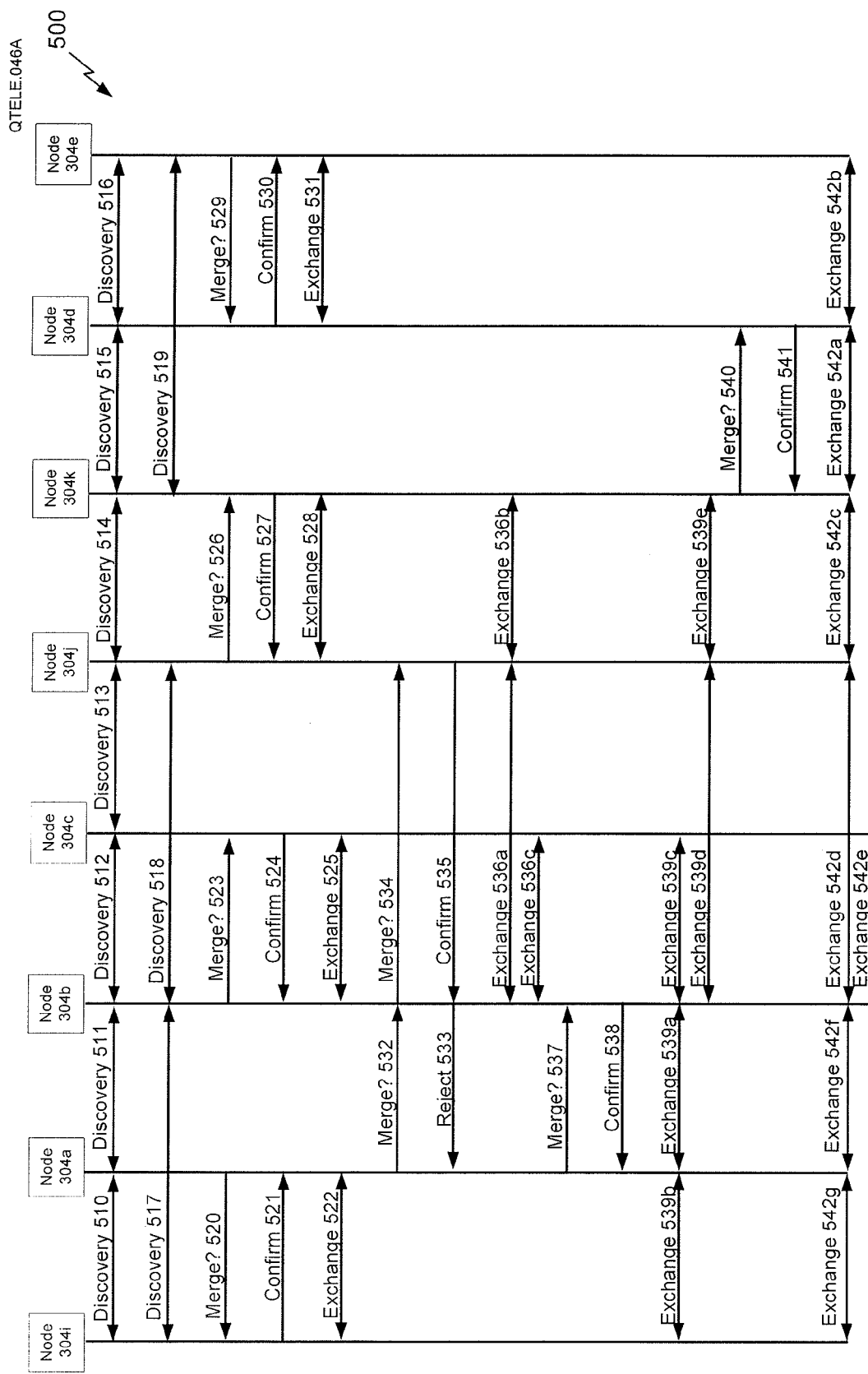
FIG. 5 shows another call flow diagram for providing service delivery and minimum spanning tree formation for service delivery in the wireless communications system of FIGS. 1 and 3A-3F.

FIG. 5 shows a call flow diagram for providing service delivery and minimum spanning tree formation for service delivery in the wireless communications system of FIGS. 1 and 3A-3F. For example, the call flow diagram 500 may describe communications that may take place between one or more of the wireless devices 304a-304k seeking a second service, as described in connection with FIGS. 3A-3F. Call flow diagram 500 may include wireless nodes 304i, 304a, 304b, 304c, 304d, 304e, 304j and 304k, which may correspond to the wireless devices 304i, 304a, 304b, 304c, 304d, 304e, 304j and 304k of FIGS. 3A-3F, respectively.

As previously described in connection with FIGS. 3A-3F, each of the nodes 304i, 304a, 304b, 304c, 304e, 304j and 304k may seek a second service, while the node 304d may provide the second service. Thus, each of the nodes 304i, 304a, 304b, 304c, 304d, 304e, 304j and 304k may broadcast a service discovery message to neighboring wireless nodes including an indication (e.g., a flag indication) that the second service is desired and that the broadcasting device is willing to collaborate with other devices (e.g., the other subscribers 304i, 304a, 304b, 304c, 304d, 304e, 304j and 304k) desiring the second service to discover a provider of the second service (e.g., the node 304d). The service discovery messages may additionally include one or more link metrics associated with the broadcasting wireless node that the receiving wireless node may not be aware of or may not be able to easily measure, as previously described in connection with FIG. 3A. For example, such link metrics may depend on several factors including but not limited to a distance between wireless devices, a bit error rate, a signal to noise ratio, a mobility of the broadcasting wireless node, and a battery life of the broadcasting wireless node. Coinciding with neighboring wireless devices for each wireless device seeking the second service, as shown in FIGS. 3A-3F, discovery messages may be exchanged as shown by discovery communications 510 through 519. Once the nodes 304a-304c, 304e and 304i-k have communicated and received the discovery messages, each of the nodes 304a-304c, 304e and 304i-k may calculate or determine the weighted link value to each wireless node based on a weighted sum of the link metrics. The wireless node 304a may determine the link to the wireless node 304i to have the lowest link weight and may send a merge request signal 520 (e.g., for forming a "loose association" with the wireless node 304i). Because the wireless node 304a is also the lowest weight link for the wireless node 304i, the wireless node 304i may send a merge confirm signal 521. The wireless nodes 304a and 304i may merge into a one fragment, for example, the fragment 315 of FIG. 3B, and exchange a list of neighboring wireless nodes along with previously calculated link weights associated with those neighboring wireless nodes in an exchange signal 522. In this way, all wireless nodes merged into a fragment may be aware of all link weights for all wireless nodes neighboring the wireless nodes in the fragment. This allows subsequent merge operations to merge along the mutually determined lowest link weight link available to any of the wireless nodes in the fragment.

Similarly, the wireless node 304b may determine the link to the wireless node 304c has the lowest link weight and may send a merge request signal 523. Because the link to the wireless node 304b is also the lowest weight link for the wireless node 304c, the wireless node 304c may send a merge confirm signal 524. The wireless nodes 304b and 304c may merge into a one fragment, for example, the fragment 316 of FIG. 3B, and exchange a list of neighboring wireless nodes along with previously calculated link weights associated with those neighboring wireless nodes in an exchange signal 525.

The wireless node 304j may determine the link to the wireless node 304k has the lowest link weight and may send a merge request signal 526. Because the link to the wireless node 304j is also the lowest weight link for the wireless node 304k, the wireless node 304k may send a merge confirm signal 527. The wireless nodes 304j and 304k may merge into a one fragment, for example, the fragment 317 of FIG. 3B, and exchange a list of neighboring wireless nodes along with previously calculated link weights associated with those neighboring wireless nodes in an exchange signal 528.

The wireless node 304e may determine the link to the wireless node 304d has the lowest link weight and may send a merge request signal 529. Because the link to the wireless node 304e is also the lowest weight link for the wireless node 304d, the wireless node 304d may send a merge confirm signal 530. The wireless nodes 304d and 304e may merge into a one fragment, for example, the fragment 318 of FIG. 3B, and exchange a list of neighboring wireless nodes along with previously calculated link weights associated with those neighboring wireless nodes in an exchange signal 531.

The wireless node 304f may determine the link to the wireless node 304e has the lowest link weight and may send a merge request signal 423. Since the link to the wireless node 304f is also the lowest weight link for the wireless node 304e, the wireless node 304e may send a merge confirm signal 424. The wireless nodes 304e and 304f may merge into a one fragment, for example, the fragment 312 of FIG. 3B, and exchange a list of neighboring wireless nodes along with previously calculated link weights associated with those neighboring wireless nodes in an exchange signal 425. At this point the wireless nodes 304a-304e and 304i-k may have the fragment relationship as shown in FIG. 3B with respect to the second service.

At this point in the call flow diagram 500, the wireless node 304a may determine that the link to wireless node 304b is the lowest weight link available to the fragment 315 and may send a merge request signal 532. However, because the link to the wireless node 304a does not have the lowest link weight available to the fragment 316, the wireless node 304b sends a merge reject signal 533. The wireless nodes 304a and 304b will not link at this time. However, because the link to the wireless node 304j is the lowest weight link for the wireless node 304b, the wireless node 304b may send a merge request signal 534. Because the link to the wireless node 304b is also the lowest weight link available for the fragment 317, the wireless node 304j may send a merge confirm signal 535. The wireless nodes 304b (part of the fragment 316) and 304j (part of the fragment 317) may merge into a one fragment, for example the fragment 327 of FIG. 3C, and exchange a list of neighboring wireless nodes along with previously calculated link weights associated with those neighboring wireless nodes in exchange signals 536a-536c. At this point the wireless nodes 304a-304e and 304i-k may have the fragment relationship as shown in FIG. 3C with respect to the second service.

At this point in the call flow diagram 500, the wireless node 304a may again determine that the link to wireless node 304b is the lowest weight link available to the fragment 315 and may send a merge request signal 537. Because the link to the wireless node 304a also presents the lowest link weight available to the fragment 327, the wireless node 304b sends a merge confirm signal 538. The wireless nodes 304a (part of fragment 315) and 304b (part of the fragment 327) may merge into a one fragment, for example the fragment 337 of FIG. 3D, and exchange a list of neighboring wireless nodes along with previously calculated link weights associated with those neighboring wireless nodes in exchange signals 539a-539e. At this point the wireless nodes 304a-304e and 304i-k may have the fragment relationship as shown in FIG. 3D with respect to the second service.

At this point in the call flow diagram 500, the wireless node 304k may determine that the link to the wireless node 304d is the lowest weight link available to the fragment 337 and may send a merge request signal 540. Since the link back to wireless node 304k is also the lowest weight link available for the fragment 318, the wireless node 304d may send a merge confirm signal 541. The wireless nodes 304k (part of fragment 337) and 304d (part of the fragment 318) may merge into a one fragment, for example the fragment 348 of FIG. 3E, and exchange a list of neighboring wireless nodes along with previously calculated link weights associated with those neighboring wireless nodes in exchange signals 542a-542g. At this point the wireless nodes 304c and 304e-304j may have the fragment relationship as shown in FIG. 3E with respect to the first service. The second service may now be delivered to each of the wireless nodes 304a-304c, 304e and 304i-k from wireless node 304d. Moreover, the links used to deliver the second service to each wireless node are the highest quality links available at the time of discovery and delivery because the service delivery tree is a minimum spanning tree as described above. The process described above regarding FIG. 5 may be configured to be performed at periodic intervals to account for network dynamics such as changing node mobility, location and battery conditions, for example.

Figure 6:
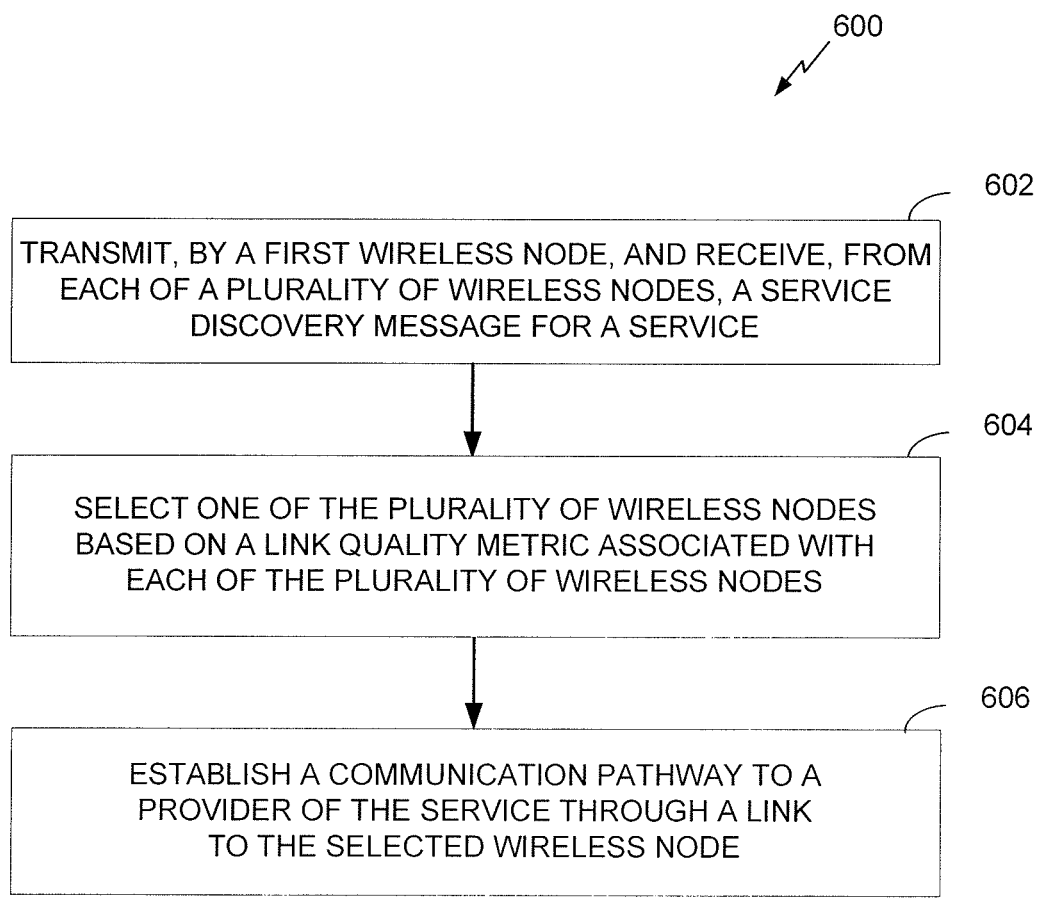
FIG. 6 shows a flowchart of another process for providing service delivery and minimum spanning tree formation for service delivery in the wireless communications system of FIGS. 1 and 3A-3F.

FIG. 6 shows a flowchart of another process for providing service delivery and minimum spanning tree formation for service delivery in the wireless communications system of FIGS. 1 and 3A-3F. The method of flowchart 600 is described herein with reference to the call flow diagrams 400 and 500 as previously described in connection with FIGS. 4 and 5. In one implementation, one or more of the steps in flowchart 600 may be performed by, or in connection with, a processor and/or transmitter, such as the processor 204 and the receiver 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

The method may begin with block 602, which includes transmitting, by a first wireless node, and receiving, from each of a plurality of wireless nodes, a service discovery message for a service. For example, as previously described in connection with FIG. 4, the wireless node 304h may transmit a discovery message for the first service to each of the wireless nodes 304g, 304i, and 304j and receive a discovery message from each of the wireless nodes 304g, 304i, and 304j, as represented by the discovery communications 412, 415 and 411, respectively.

The method may continue with block 604, which includes selecting one of the plurality of wireless nodes based on a link quality metric associated with each of the plurality of wireless nodes. For example, as described with respect to FIG. 4, the wireless node 304j may select the wireless node 304h based on the link to the wireless node 304h having the lowest available link weight for connection.

The method may continue with block 606, which includes establishing a communication pathway to a provider of the service through a link to the selected wireless node. For example, the wireless node 304j may establish a communication pathway to the wireless node 304i which provides the first service to the wireless node 304j through a link to the wireless node 304h.

Figure 7:
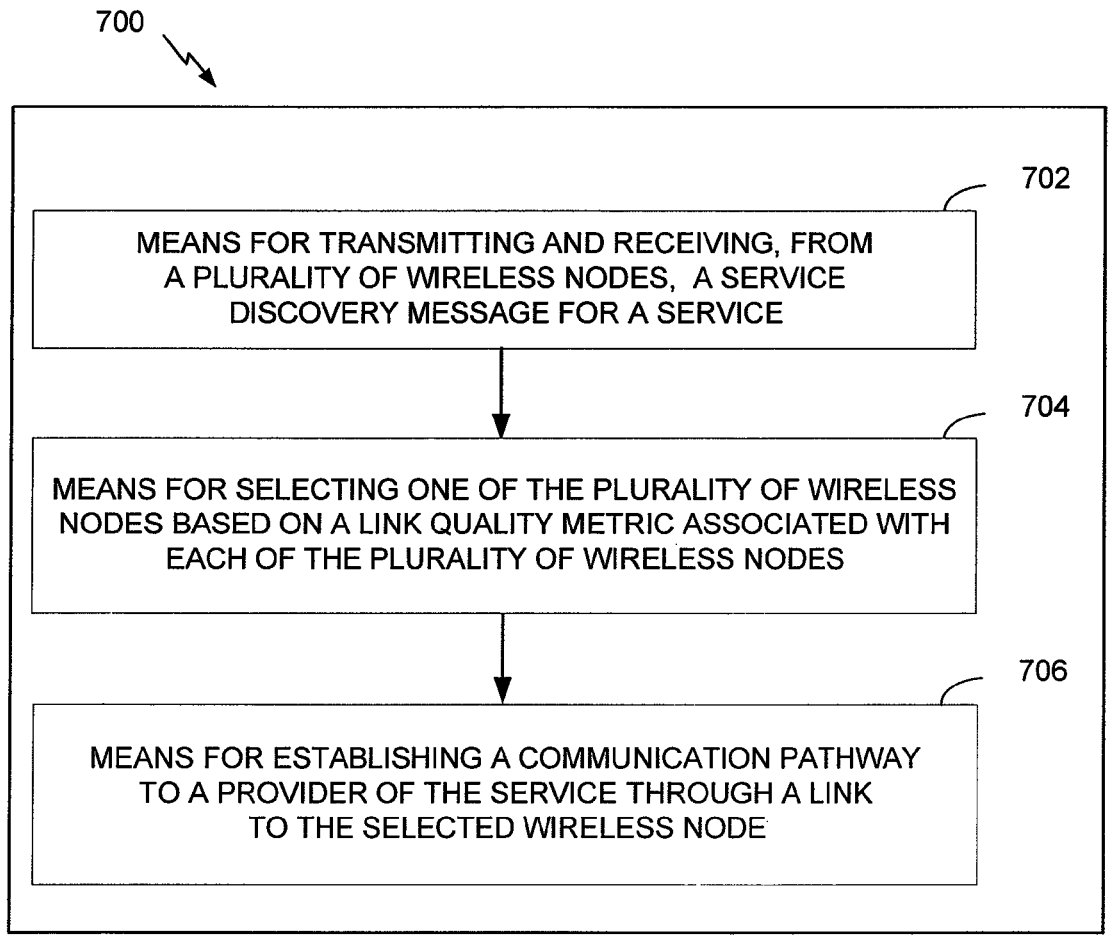
FIG. 7 shows another functional block diagram of an apparatus for wireless communication that may be employed within the wireless communication system of FIGS. 1 and 3A-3F.

FIG. 7 shows another functional block diagram of an apparatus for wireless communication that may be employed within the wireless communication system of FIGS. 1 and 3A-3F. Those skilled in the art will appreciate that such an exemplary device may have more components than the simplified networked communication apparatus 700 shown in FIG. 7. The wireless power apparatus 700 shown includes only those components useful for describing some prominent features of implementations within the scope of the claims.

The wireless power apparatus 700 includes means 702 for transmitting and receiving, from a plurality of wireless nodes, a service discovery message for a service. In an implementation, the means 802 for transmitting and receiving a service discovery message for a service can be configured to perform one or more of the functions described above with respect to block 602 (FIG. 6). In various implementations, the means 702 for transmitting a service discovery message for a service can be implemented by one or more of the wireless devices 304a-304k of FIGS. 3A-3F, the wireless nodes 304a-304k of FIGS. 4-5, as well as the transceiver 214 of FIG. 2.

The wireless power apparatus 700 includes means 704 for selecting one of the plurality of wireless nodes based on a link quality metric associated with each of the plurality of wireless nodes. In an implementation, the means 704 for selecting one of the plurality of wireless nodes based on a link quality metric associated with each of the plurality of wireless nodes can be configured to perform one or more of the functions described above with respect to block 604 (FIG. 6). In various implementations, the means 706 for selecting one of the plurality of wireless nodes based on a link quality metric associated with each of the plurality of wireless nodes can be implemented by one or more of the wireless devices 304a-304k of FIGS. 3A-3F, the wireless nodes 304a-304k of FIGS. 4-5, as well as the processor 204 of FIG. 2.

The wireless power apparatus 700 includes means 706 for establishing a communication pathway to a provider of the service through a link to the selected wireless node. In an implementation, the means 706 for establishing a communication pathway to a provider of the service through a link to the selected wireless node can be configured to perform one or more of the functions described above with respect to block 606 (FIG. 6). In various implementations, the means 706 for establishing a communication pathway to a provider of the service through a link to the selected wireless node can be implemented by one or more of the wireless devices 304a-304k of FIGS. 3A-3F, the wireless nodes 304a-304k of FIGS. 4-5, as well as the processor 204 or the transceiver 214 of FIG. 2.

As previously described, any of the devices 104 and 106 of FIG. 1, which may correspond to the devices 304a-304k of FIGS. 3A-3F, may be NAN devices associated with a NAN. The following disclosure may show the previously described functionality of the devices in the context of a NAN, including the architecture of NAN devices.

Figure 8:
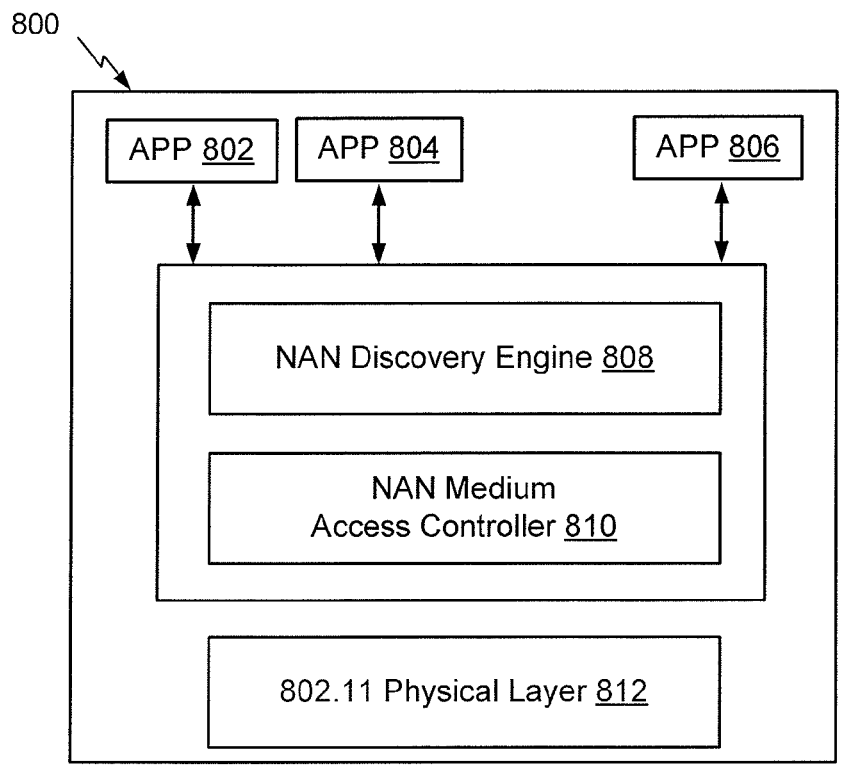
FIG. 8 shows a functional block diagram of an exemplary wireless neighbor aware network device that may be employed within the wireless communication system of FIGS. 1 and 3A-3F.

FIG. 8 shows a functional block diagram of an exemplary wireless NAN device 800 that may be employed within the wireless communication system of FIGS. 1 and 3A-3F. The NAN device 800 may additionally correspond to the wireless device 200 of FIG. 2, for example. The NAN device 800 may include a plurality of applications (APP 802, 804 and 806). Although three applications are shown, the NAN device 800 may comprise any number of applications. In some implementations, the applications 802, 804, 806 may comprise software stored in memory, corresponding to memory 206 of the wireless device 202 and which may be executed by the processor 204 of FIG. 2, for example. The NAN device 800 may additionally include a NAN discovery engine 808, a NAN medium access controller (MAC) 810, and an 802.11 Physical Layer 812. In some implementations, one or more of the NAN discovery engine 808, the NAN medium access controller 810, and the 802.11 Physical Layer 812 may comprise hardware, or software stored in a memory corresponding to memory 206 and which may be executed by the processor 204 of the wireless device 202 of FIG. 2, for example.

In some implementations, the APPs 802, 804, 806 may be provided with NAN APIs that allow them to access NAN functions by the NAN Discovery Engine 808. The NAN MAC 810 may control the transmission and reception of messages including but not limited to maintaining synchronization, performing scalable channel access, and initiation of device cluster formation and merging of already-existing device clusters within the NAN. The 802.11 Physical Layer 812 may perform the transmission and/or reception of signals from and to the device 800, respectively.

Figure 9:
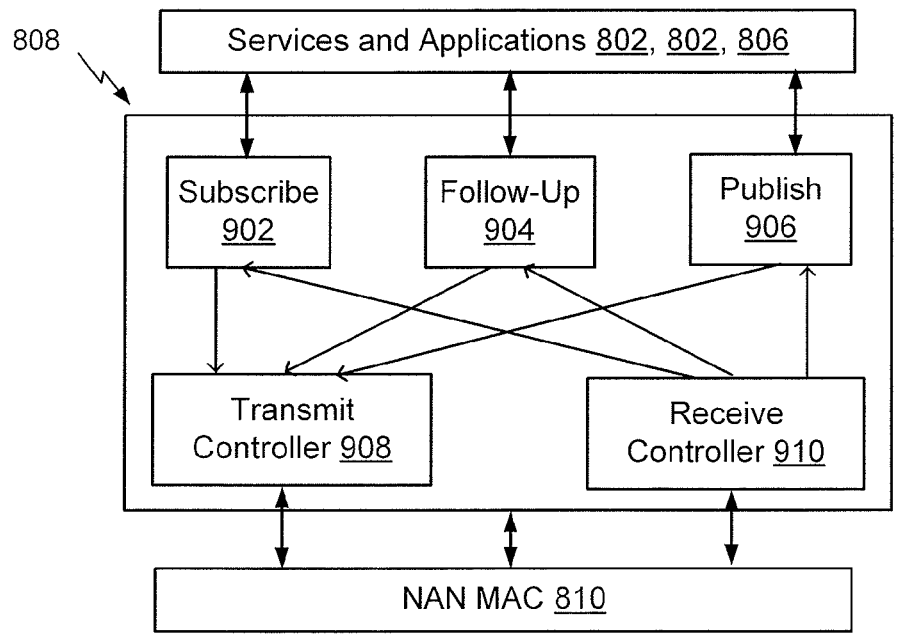
FIG. 9 shows a functional block diagram of an exemplary neighbor aware network Discovery Engine that may be employed within the wireless neighbor aware network device of FIG. 8.

FIG. 9 shows a functional block diagram of an exemplary NAN Discovery Engine 808 that may be employed within the wireless NAN device 800 of FIG. 8. In some implementations the NAN discovery engine 808 may comprise a subscribe module 902, a follow-up module 904, a publish module 906, a transmit controller 908, and a receive controller 910. The NAN discovery engine 808 may comprise a logical entity that provides NAN functionality accessible by applications (e.g., the Applications 802, 804, 806) through the API. The NAN discovery engine 808 may straddle the host and modem processor allowing for service discovery while minimizing wake-ups for the host processor. In some implementations, the NAN discovery engine 808 may reside primarily in the modem. The NAN discovery engine 808 may provide publish and subscribe functionality to the NAN device 800. For example, applications may perform a publish operation for transmitting either solicited or unsolicited advertisements for services. Applications may perform a subscribe operation when querying for the availability of a particular service from one or more other NAN devices of the NAN, as previously described in connection with FIGS. 3A-3F, 4 and 5.

In some implementations, a service or application (e.g., one or more of the Applications 802, 804, 806) may make a service discoverable by inserting one or more of the following parameters into a publish transmission message: service_name, matching_filter, service_specific_info, and configuration_parameters. The service_name parameter may comprise a UTF-8 name string identifying the service or application. The matching_filter parameter may comprise a sequence of values which specify further response conditions beyond the service name when solicited transmission are utilized. The service_specific_info parameter may comprise a sequence of values which should be conveyed to the Discovery Engine of a NAN Device that has invoked a subscribe operation corresponding to this publish operation. The configuration_parameters may specify if service publishing is to be unsolicited or solicited, time to live, etc.

In some implementations, a service or application (e.g., one or more of the Applications 802, 804, 806) may trigger a search for a service by inserting one or more of the following parameters into a subscribe transmission message: service_name, matching_filter, service_specific_info, and configuration_parameters. The service_name parameter may comprise a UTF-8 name string identifying the service or application. The matching_filter parameter may comprise a sequence of values which specify further response conditions beyond the service name when active subscription is utilized. The service_specific_info parameter may comprise a sequence of values which further specify the published service beyond the service name. The configuration_parameters may determine the type of subscribing as passive (e.g., listen for unsolicited publish transmission), or active (transmit query operations), etc.

In a NAN, several devices may associate with one another to form a NAN cluster. Devices associated with a particular NAN cluster may have synchronized clocks with one another, may wake up together periodically for device and service discovery, and may additionally operate on the same communication channel. Each NAN cluster autonomously builds a tree structure anchored to one NAN device called the Anchor Master. The Anchor master may transmit beacon frames which may be utilized by each of the NAN devices in the NAN to synchronize their clocks with one another. The timing (e.g., clock) of the Anchor master is propagated to all NAN devices through NAN master devices (e.g., NAN devices that have the highest master rank of the NAN devices within their range) and sync devices (e.g., nonmaster devices that may be located between and may act as a relay device for an upstream NAN master device and a downstream NAN master device that is out of direct range of the upstream NAN master device). A NAN cluster may be identified by a cluster ID transmitted in the A3 field in each NAN frame (as will be shown in more detail in connection with FIG. 12 below), where the cluster ID may be determined and set by the NAN device initiating the NAN cluster.

FIG. 10 shows a timeline 1000 for example communications on a NAN channel by NAN devices as may be employed within the wireless communication system of FIGS. 1 and 3A-3F. Two types of frames may be transmitted for NAN operation: beacon frames and discovery frames. The beacon frames may be utilized for synchronization and cluster discovery while discovery frames may be utilized for requesting and/or advertising services as previously described. As shown, the timeline 1000 may comprise two parts: discovery windows 1002 and portions 1004 falling outside the discovery windows. The discovery window 1002 may comprise a periodically occurring short time window when all NAN devices associated with a particular NAN cluster will be awake. Discovery frames 1006 and sync frames 1008 may be transmitted during the discovery window 1002, while discovery beacons 1010 may be transmitted during the interval 1004 between discovery windows 1002. The sync frames 1008 (or beacons) may be utilized for time synchronization function correction for devices already associated with the particular NAN network. The discovery beacons 1010 may be utilized by NAN devices that have not yet associated with the particular NAN cluster in order to discover existing NANs or NAN clusters to which the NAN device can associate. In some implementations, the time between the beginning of adjacent discovery windows may be approximately 512 ms and the duration of the discovery windows 1002 themselves may be approximately 16 ms, although these durations are exemplary, not limiting, and may be any other values based on a particular implementation.

FIG. 11 shows a timeline 1100 for example communications on a social Wi-Fi mesh channel by NAN devices as may be employed within the wireless communication system of FIGS. 1 and 3A-3F. Once devices have associated with a particular social Wi-Fi mesh (e.g., the devices are all seeking or providing the same service or services), the devices may transfer data between one another over a social Wi-Fi mesh channel. Thus, in effect, each of the devices in the social Wi-Fi mesh may act as a sink for data associated with the particular service, and if required in the case of multi-hop service discovery and delivery, a relay for transferring data associated with that particular service between devices that may not be able to directly communicate with one another in the social Wi-Fi mesh. Such data transfer may occur during the portions 1004 falling outside the discovery windows 1002. Such data transfers may comprise paging windows 1102 followed by associated transmission windows 1104. The timing of the paging 1102 and transmission 1104 windows may be defined with reference to a timing offset 1106 from the discovery window. Timing between one pair of paging 1102 and transmission 1104 windows and an adjacent pair of paging 1102 and transmission 1104 windows may be defined by a transmission offset 1108. Thus, the first paging window 1102 after a discovery window 1002 may begin at a time after the discovery window 1002 equal to the timing offset 1106 and each successive paging window 1102 may begin at a time after the previous transmission window 1104 equal to the timing offset 1108.

In order to further conserve battery power of NAN devices, within each paging window, a traffic indication message (TIM) may be transmitted having, for example, a respective bit corresponding to each NAN device in the NAN cluster. All NAN devices may wake up during each paging window 1102 and may listen for a TIM. If the respective bit of the TIM for a particular NAN device is set, the associated NAN device may remain awake during the transmission window 1104 in order to either transmit or receive the indicated data. Contrarily, if the respective bit of the TIM for the particular NAN device is not set, that NAN device may go to sleep during the transmission window 1104 and wait to wake up until the next paging window. By this mechanism NAN devices may reduce their average energy usage over time, improving battery life and user experience.

FIG. 12 shows an example NAN beacon frame 1200 as may be employed within the wireless communication system of FIGS. 1 and 3A-3F. Each beacon frame sent within the NAN may generally have the format of beacon frame 1200. The beacon frame 1200 may comprise a frame control field 1202, a duration field 1204, a first ID field A1 1206, a second ID field A2 1208, a third ID field A3 1210, a sequence control field 1212, a time stamp field 1214, a beacon interval field 1216, a capability field 1218, a NAN information element (IE) field 1220 and a frame check sequence field 1222. As previously described, the A3 field 1210 may include the NAN cluster associated ID for each beacon frame transmitted within the NAN cluster so that any device receiving the beacon frame 1200 will be able to determine that it belongs to that particular NAN cluster. The NAN IE field 1220 may, in turn, carry one or more NAN attributes. The NAN IE field 1220 may generally have the format as shown by Table 1 below.

TABLE 1

| Field | Size (octets) | Value (hex) | Description |
|---|---|---|---|
| Element ID | 1 | 0xDD | IEEE 802.11 vendor specific info element |
| Length | 1 | Variable | Length of the following IE fields (4 + total length of NAN attributes field) |
| OUI | 3 | 0x50-6F-9A | WFA specific OUI |
| OUI Type | 1 | 0x13 | Identifying the type and version of the NAN IE |
| NAN Attributes | Variable | Variable | One or more NAN attributes |

In order to advertise, publish or subscribe to particular services, NAN devices may transmit discovery frames 1006 (as shown in FIG. 10). The discovery frame 1006 may comprise a plurality of fields as shown by Table 2 below.

TABLE 2

| Field | Size (octets) | Value (hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x13 | Identifying the type and version of the NAN |
| NAN Attributes | Variable | Variable | One or more NAN Attributes |

The NAN attributes field may include one or more NAN attributes. The field format for a general attribute described in the NAN attributes field as defined in Table 2 above may comprise a plurality of fields (or subfields) as shown by Table 3 below.

TABLE 3

| Field | Size (octets) | Value (hex) | Description |
|---|---|---|---|
| Attribute ID | 1 | Variable | Identifies the type of NAN attribute |

TABLE 3-continued

| Field | Size (octets) | Value (hex) | Description |
|---|---|---|---|
| Length | 2 | Variable | Length of the following fields in the attribute |
| Attribute Body Field | Variable | Variable | NAN Attribute specific information fields |

When a service is either published or subscribed to, a service descriptor attribute may be inserted into the NAN attributes field as previously shown in Table 2. The service descriptor attribute may comprise a plurality of fields (or subfields) as shown in Table 4 below.

TABLE 4

| Field | Size (octets) | Value (hex) | Description |
|---|---|---|---|
| Attribute ID | 1 | 0x0A | Identifies the type of NAN attribute |
| Length | 2 | Variable | Length of the following fields in the attribute |
| Service ID | 6 | Variable | Mandatory field that contains the hash of the service name |
| Instance ID | 1 | Variable | Publish_ID and/or Subscribe_ID |
| Service Control | 1 | Variable | Mandatory field that defines the Service Control bitmap |
| Matching Filter Length | 1 | Variable | An optional field and present if a matching service discovery filter is used |
| Matching Filter | Variable | Variable | An optional field that is a sequence of length and value pairs that identify the matching service discovery filters |
| Service Response Filter Length | 1 | Variable | An optional field and present if a service response filter is used |
| Service Response Filter | Variable | Variable | An optional field that is a sequence of length and value pairs that identify the matching service response filters |
| Service Info Length | 1 | Variable | An optional field and present if service specific information is used |
| Service Info | 1 | Variable | An optional field that contains the service specific information. Its contents may be determined by the application and not specified herein. |

The discovery frame 1006 may additionally comprise a mesh network attribute as one of the NAN attributes, which may comprise one or more of the fields having the format as shown by Table 5 below.

TABLE 5

| Field | Size (octets) | Value (hex) | Description |
|---|---|---|---|
| Attribute ID | 1 | 221 | Using Vendor specific attribute ID |
| Length | 1 | Variable | |
| OUI | 3 | TBD | Qualcomm vendor OUI |
| Vendor Attribute Type | 1 | 1 | Q-Mesh Attribute |
| Q-Mesh Key | 4 | Variable | This field is useful to distinguish two mesh networks having the same Mesh ID. Hash of the current mesh group key |
| Q-Mesh Channel | 1 | Variable | Indicate the channel the mesh network is operating on |
| Q-Mesh Control | 2 | Variable | See Table 3 for Q-Mesh TX Schedule |
| Q-Mesh ID | Variable | Variable | As defined in IEEE 802.11-2012 section 8.4.2.101 Mesh ID element |

Table 6 below shows exemplary bit designations of the Q-Mesh control field of Table 5, which may designate whether the transmit window 1104 will repeat, the discovery window offset 1106, the transmission offset 1108, the transmission window 104 size, the paging window 1102 size, etc.

TABLE 6

| Bits | Information | Notes |
|---|---|---|
| 0 | Mesh Tx Repeat | Indicates if the mesh Tx window repeats multiple times between consecutive DWs. |
| 1-2 | DW Offset | Indicates when the mesh Tx window starts after DW. The value is set as follows: 0: 0 TU; 1: 16 TU; 2: 32 TU; 3: 64 TU |
| 3-4 | Mesh Tx Offset | Indicates the Tx window start time offsets between consecutive mesh Tx windows. The value is set as follows: 0: 0 TU; 1: 16 TU; 2: 32 TU; 3: 64 TU |
| 5-6 | Mesh Tx Window | Indicates the size of the mesh transmission window. The value is set as follows: 0: 64 TU; 1: 128 TU; 2: 256 TU; 3: reserved |
| 7-8 | Paging Window Size | Indicates the size of the paging window which occurs at the beginning of each Mesh Tx window. The value is set as follows: 0: 2 TU; 1: 5 TU; 2: 8 TU; 3: 12 TU |
| 9-10 | Mesh Heartbeat | The time for which the mesh will remain alive without hearing any provider heartbeat to keep the mesh alive. 0: 30 s; 1: 60 s; 2: 120 s; 3: 300 s |
| 11-15 | Reserved | |

Figure 13:
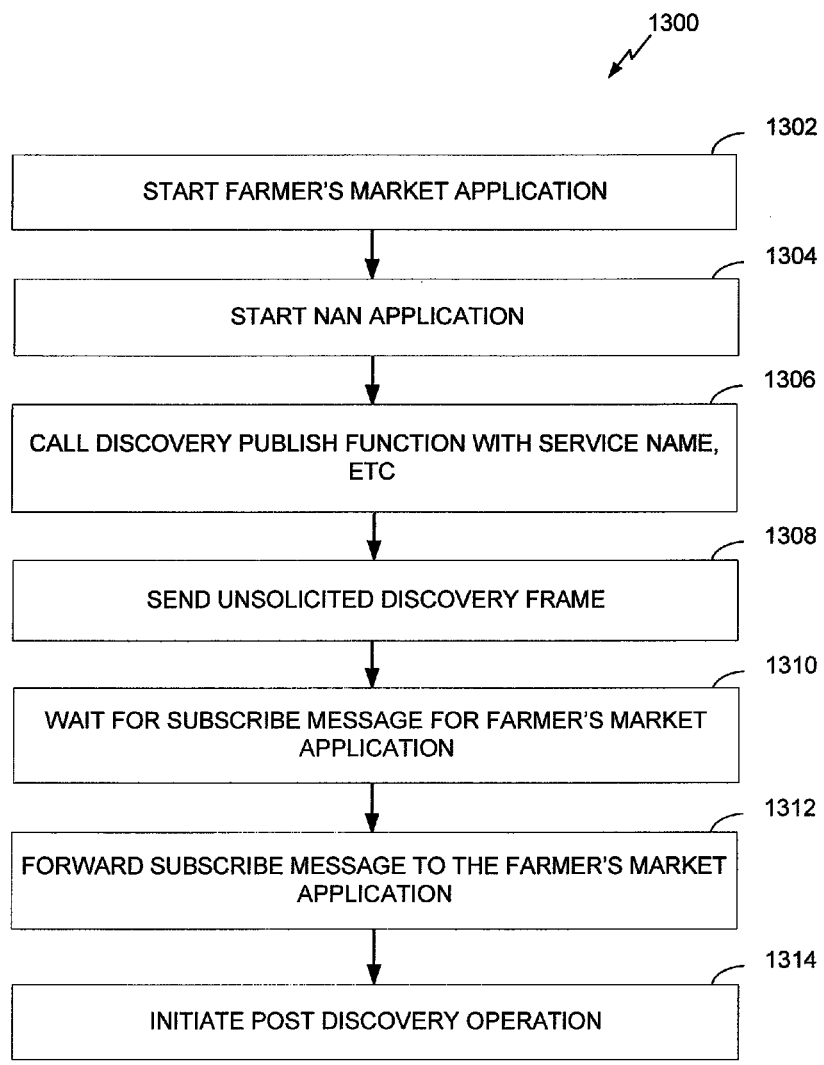
FIG. 13 shows a flowchart of an exemplary use case for providing service delivery in the wireless communications system of FIGS. 1 and 3A-3F.

FIG. 13 shows a flowchart 1300 of an exemplary use case for providing service delivery in the wireless communications system of FIGS. 1 and 3A-3F. The flowchart 1300 may correspond to an exemplary use case where a farmer's market application allows a user of a NAN device to determine what products are being offered at what booths of a particular farmers market. The flowchart 1300 may begin with block 1302 where the farmer's market application is started on the user's NAN device. The NAN device may then autonomously start the NAN application at block 1304. If no NAN exists, the user's NAN device may initiate a NAN.

At block 1306 the user's NAN device may call a discovery publish function as previously described in connection with FIGS. 8 and 9. The publish discovery function may include the service name and other necessary or optional parameters as previously described in connection with at least one of Tables 1-5.

At block 1308 an unsolicited discovery frame may be transmitted to see whether any other devices in range either provide or are also seeking the farmer's market application interconnect service. As previously described in connection with FIG. 8, this may be performed by the NAN MAC 810.

At block 1310 the user's NAN device may wait for a subscribe message for the farmer's market application. Such a subscribe message may be received in response to the unsolicited publish frame previously sent in block 1308. If received, the subscribe message may be forwarded to the farmer's market application on the user's NAN device at block 1312. A peer-to-peer connection may be generated according to the steps previously described in connection with FIGS. 3A-3F and 6.

The method may then advance to block 1314 where post discovery operation may be initiated. The publish and subscribe functions may include the insertion, transmission and reception of parameters that may minimize processor wakeup for the farmer's market application and/or the NAN application as well as eliminate redundant responses to queries, as previously described in connection with at least one of Tables 1-5.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication by a first wireless node, comprising:
   receiving, from each of a plurality of wireless nodes, a service discovery message for a service;
   selecting, after receiving the service discovery message, one of the plurality of wireless nodes based on a link quality metric of a first link from the first wireless node to the selected wireless node having the highest link quality metric of any link from the first wireless node to any of the plurality of wireless nodes and based on a link quality metric of a second link from the selected wireless node to the first wireless node having the highest link quality metric of any link from the selected wireless node to any other wireless node; and
   establishing a communication pathway between the selected wireless node and a provider of the service via the first link, wherein the first link is used if the selected wireless node also selects the first wireless node based on the link quality metric of the second link.

2. The method of claim 1, wherein the link quality metric of the first link or the second link is a weighted sum of one or more parameters comprising: a distance to a respective wireless node, a location of the respective wireless node, a bit error rate, a signal to noise ratio, a battery life of the respective wireless node, and a mobility indication associated with the respective wireless node.

3. The method of claim 1, wherein the communication pathway further comprises at least one intermediate link between the selected wireless node and the provider, each of the at least one intermediate link being established based on a link quality metric associated with a respective intermediate wireless node either providing or seeking the service.

4. The method of claim 1, wherein the communication pathway forms at least a portion of a minimum spanning service delivery tree associated with the service.

5. The method of claim 1, wherein:
   transmitting the service discovery message further comprises transmitting one or more parameters associated with at least one of the first link quality metric or the second link quality metric; and
   receiving the service discovery message further comprises receiving one or more parameters associated with the link quality metric associated with each of the plurality of wireless nodes.

6. The method of claim 1, wherein establishing the communication pathway further comprises:
   receiving or transmitting a request to associate with the selected wireless node; and
   receiving or transmitting a confirmation to associate with the selected wireless node.

7. The method of claim 1, wherein the first wireless node is associated with a neighbor aware network with which the plurality of wireless nodes are also associated.

8. An apparatus for wireless communication, comprising:
   a transceiver configured to receive, from a plurality of wireless nodes, a service discovery message for a service;
   a processor configured to:
      select, after receiving the service discovery message, one of the plurality of wireless nodes based on a link quality metric of a first link from the apparatus to the selected wireless node having the highest link quality metric of any link from the apparatus to any of the plurality of wireless nodes and based on a link quality metric of a second link from the selected wireless node to the apparatus having the highest link quality metric of any link from the selected wireless node to any other wireless node; and
      establishing a communication pathway between the selected wireless node and a provider of the service via the first link, wherein the first link is used if the selected wireless node also selects the apparatus based on the link quality metric of the second link.

9. The apparatus of claim 8, wherein the link quality metric of the first link or the second link is a weighted sum of one or more parameters comprising: a distance to a respective wireless node, a location of the respective wireless node, a bit error rate, a signal to noise ratio, a battery life of the respective wireless node, and a mobility indication associated with the respective wireless node.

10. The apparatus of claim 8, wherein the communication pathway comprises at least one intermediate link between the selected wireless node and the provider, each of the at least one intermediate link being established based on a link quality metric associated with a respective intermediate wireless node either providing or seeking the service.

11. The apparatus of claim 8, wherein the communication pathway forms at least a portion of a minimum spanning service delivery tree associated with the service.

12. The apparatus of claim 8, wherein:
   while transmitting the service discovery message, the transceiver is further configured to transmit one or more parameters associated with at least one of the first link quality metric or the second link quality metric; and
   while receiving the service discovery message, the transceiver is further configured to receive one or more parameters associated with the link quality metric associated with each of the plurality of wireless nodes.

13. The apparatus of claim 8, wherein, while establishing the communication pathway, the processor is further configured to enable the transceiver to perform:
   receiving or transmitting a request to associate with the selected wireless node; and
   receiving or transmitting a confirmation to associate with the selected wireless node.

14. The apparatus of claim 8, wherein the apparatus is associated with a neighbor aware network with which the plurality of wireless nodes are also associated.

15. An apparatus for wireless communication, comprising:
   means for receiving, from a plurality of wireless nodes, a service discovery message for a service;
   means for selecting, after receiving the service discovery message, one of the plurality of wireless nodes based on a link quality metric of a first link from the apparatus to the selected wireless node having the highest link quality metric of any link from the apparatus to any of the plurality of wireless nodes and based on a link quality metric of a second link from the selected wireless node to the apparatus having the highest link quality metric of any link from the selected wireless node to any other wireless node; and means for establishing a communication pathway between the selected wireless node and a provider of the service via the first link, wherein the first link is used if the selected wireless node also selects the apparatus based on the link quality metric of the second link.

16. The apparatus of claim 15, wherein the link quality metric of the first link or the second link is a weighted sum of one or more parameters comprising: a distance to a respective wireless node, a location of the respective wireless node, a bit error rate, a signal to noise ratio, a battery life of the respective wireless node, and a mobility indication associated with the respective wireless node.

17. The apparatus of claim 15, wherein the communication pathway further comprises at least one intermediate link between the selected wireless node and the provider, each of the at least one intermediate link being established based on a link quality metric associated with a respective intermediate wireless node either providing or seeking the service.

18. The apparatus of claim 15, wherein the communication pathway forms at least a portion of a minimum spanning service delivery tree associated with the service.

19. The apparatus of claim 15, wherein:
while transmitting the service discovery message, the means for receiving the service discovery message is further configured to transmit one or more parameters associated with at least one of the first link quality metric or the second link quality metric; and
while receiving the service discovery message, the means for transmitting and receiving the service discovery message is further configured to receive one or more parameters associated with the link quality metric associated with each of the plurality of wireless nodes.

20. The apparatus of claim 15, comprising:
means for receiving or transmitting a request to associate with the selected wireless node; and
means for receiving or transmitting a confirmation to associate with the selected wireless node.

21. A non-transitory computer-readable medium comprising code that, when executed, causes an apparatus to:

receive, from a plurality of wireless nodes, a service discovery message for a service;
select, after receiving the service discovery message, one of the plurality of wireless nodes based on a link quality metric of a first link from the apparatus to the selected wireless node having the highest link quality metric of any link from the apparatus to any of the plurality of wireless nodes and based on a link quality metric of a second link from the selected wireless node to the apparatus having the highest link quality metric of any link from the selected wireless node to any other wireless node; and
establishing a communication pathway between the selected wireless node and a provider of the service via the first link, wherein the first link is used if the selected wireless node also selects the apparatus based on the link quality metric of the second link.

22. The non-transitory computer-readable medium of claim 21, wherein the link quality metric is a weighted sum of one or more parameters comprising: a distance to a respective wireless node, a location of the respective wireless node, a bit error rate, a signal to noise ratio, a battery life of the respective wireless node, and a mobility indication associated with the respective wireless node.

23. The non-transitory computer-readable medium of claim 21, wherein the communication pathway further comprises at least one intermediate link between the selected wireless node and the provider, each of the at least one intermediate link being established based on a link quality metric associated with a respective intermediate wireless node either providing or seeking the service.

24. The non-transitory computer-readable medium of claim 21, wherein transmitting the service discovery message further comprises one of:
transmitting one or more parameters associated with at least one of the first link quality metric or the second link quality metric; and
receiving one or more parameters associated with the link quality metric associated with each of the plurality of wireless nodes.

25. The apparatus of claim 8, further comprising an antenna, the transceiver configured to establish, via the antenna, the communication pathway and further wherein the apparatus is configured as a wireless node.

26. The apparatus of claim 15, wherein the apparatus is associated with a neighbor aware network with which the plurality of wireless nodes are also associated.

* * * * *